US012479221B2

(12) United States Patent
Yamashita

(10) Patent No.: US 12,479,221 B2
(45) Date of Patent: Nov. 25, 2025

(54) PRINTING APPARATUS

(71) Applicant: SEIKO EPSON CORPORATION, Tokyo (JP)

(72) Inventor: Norihiro Yamashita, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 255 days.

(21) Appl. No.: 18/477,577

(22) Filed: Sep. 29, 2023

(65) Prior Publication Data

US 2024/0109348 A1 Apr. 4, 2024

(30) Foreign Application Priority Data

Sep. 30, 2022 (JP) ................................ 2022-157641

(51) Int. Cl.
*B41J 25/00* (2006.01)
*B41J 25/308* (2006.01)
*B41J 29/02* (2006.01)

(52) U.S. Cl.
CPC .......... *B41J 25/001* (2013.01); *B41J 25/308* (2013.01); *B41J 29/02* (2013.01)

(58) Field of Classification Search
CPC . B41J 3/4078; B41J 11/06; B41J 11/20; B41J 25/001; B41J 25/308; B41J 29/00; B41J 29/02
See application file for complete search history.

(56) References Cited

U.S. PATENT DOCUMENTS

2010/0005990 A1* 1/2010 Sapir-Haim ............ B41J 11/20 271/3.09
2021/0243310 A1* 8/2021 Sasaki ............... G06V 40/1306

FOREIGN PATENT DOCUMENTS

JP 2013-220911 A 10/2013

* cited by examiner

*Primary Examiner* — Anh T Vo
(74) *Attorney, Agent, or Firm* — Dority & Manning, P.A.

(57) ABSTRACT

A printing apparatus includes a medium support unit having a support surface that supports a medium. A position adjustment unit includes a plurality of position adjustment mechanisms that adjust a position of a support surface in an intersecting direction. The position adjustment unit can change an inclination of the support surface by some of the plurality of position adjustment mechanisms moving independently, and can change the position of the support surface in the intersecting direction by all of the plurality of position adjustment mechanisms moving in conjunction with each other.

11 Claims, 16 Drawing Sheets

PRINTING APPARATUS

The present application is based on, and claims priority from JP Application Serial Number 2022-157641, filed Sep. 30, 2022, the disclosure of which is hereby incorporated by reference herein in its entirety.

BACKGROUND

1. Technical Field

The present disclosure relates to a printing apparatus.

2. Related Art

For example, JP-A-2013-220911 discloses a printing apparatus that is provided with a head capable of ejecting a liquid, and that performs printing on a medium such as a T-shirt. In such a printing apparatus, it is possible to move the medium from the outside of a housing to the inside of the housing by moving a tray, on which the medium is placed, in the horizontal direction, after the medium is placed on a support surface of the tray on the outside of the housing. With this configuration, after the medium is placed on the support surface on the outside of the housing, it is possible to perform the printing on the medium that has been moved from the outside of the housing to the inside of the housing.

In such a printing apparatus, an inclination adjustment unit is provided that is capable of adjusting an inclination of the support surface on which the medium is placed, and the medium can be appropriately placed by adjusting the inclination adjustment unit. Further, a position adjustment unit is generally provided separately from the inclination adjustment unit, and a distance between the medium placed on the tray and the head is appropriately controlled by adjusting the position adjustment unit.

However, in such a printing apparatus, the inclination adjustment unit is provided separately from the position adjustment unit. Thus, this leads to an increase in the size of the printing apparatus, and it is desired to reduce the size of the printing apparatus.

SUMMARY

A printing apparatus for solving the above-described problem includes a medium support unit having a support surface supporting a medium, a head configured to eject a liquid onto the medium supported by the support surface, and a head moving unit configured to move the head. The medium support unit includes a position adjustment unit configured to adjust a position of the support surface in an intersecting direction intersecting the support surface. The position adjustment unit includes a plurality of position adjustment mechanisms configured to adjust the position of the support surface in the intersecting direction, the position adjustment unit being configured to change an inclination of the support surface by some of the plurality of position adjustment mechanisms moving independently, and to change the position of the support surface in the intersecting direction by all the plurality of position adjustment mechanisms moving in conjunction with each other.

DESCRIPTION OF EMBODIMENTS

First Embodiment

An embodiment of a printing apparatus will be described below. In the following description, a direction intersecting (for example, orthogonal to) a vertical direction Z is referred to as a width direction X, and a direction intersecting the vertical direction Z and the width direction X is referred to as a front-rear direction Y. One side in the width direction X is referred to as a first width direction X1, and the other side in the width direction X is referred to as a second width direction X2. One side in the front-rear direction Y is referred to as a front side Y1, and the other side in the front-rear direction Y is referred to as a rear side Y2. The upper side in the vertical direction Z is referred to as an upper side Z1, and the lower side in the vertical direction Z is referred to as a lower side Z2. The width direction X corresponds to an example of a first direction. The front-rear direction Y corresponds to an example of a second direction. The vertical direction Z corresponds to an example of an intersecting direction.

Printing Apparatus 10

Figure 1:
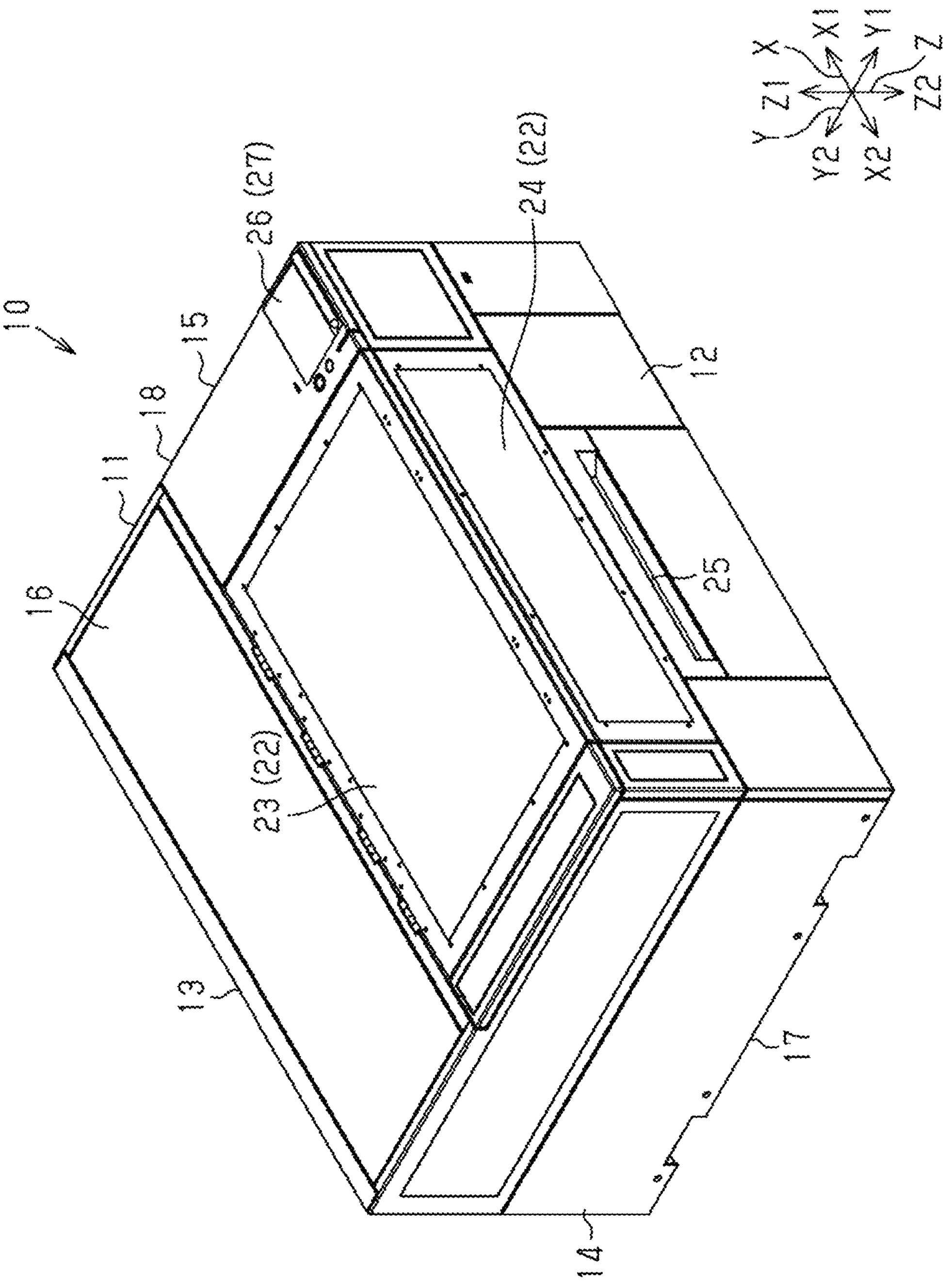
FIG. 1 is a perspective view illustrating a printing apparatus.

A printing apparatus 10 is configured to perform printing on a medium, as illustrated in FIG. 1. The printing apparatus 10 may be configured to perform the printing on a medium by ejecting a liquid. The printing apparatus 10 may be configured to perform the printing on a flexible medium, such as a T-shirt. The printing apparatus 10 may be configured such that a medium is placed in the interior thereof by a user.

Housing 11

The printing apparatus 10 is provided with a housing 11. The housing 11 may have a rectangular shape. The housing 11 is provided with a front surface 12 facing the front side Y1. The housing 11 is provided with a back surface 13 facing the rear side Y2. The housing 11 is provided with a left side surface 14 facing the second width direction X2.

The housing 11 is provided with a right side surface 15 facing the first width direction X1. The housing 11 is provided with a top surface 16 facing the upper side Z1. The housing 11 is provided with a bottom surface 17 facing the lower side Z2.

Figure 2:
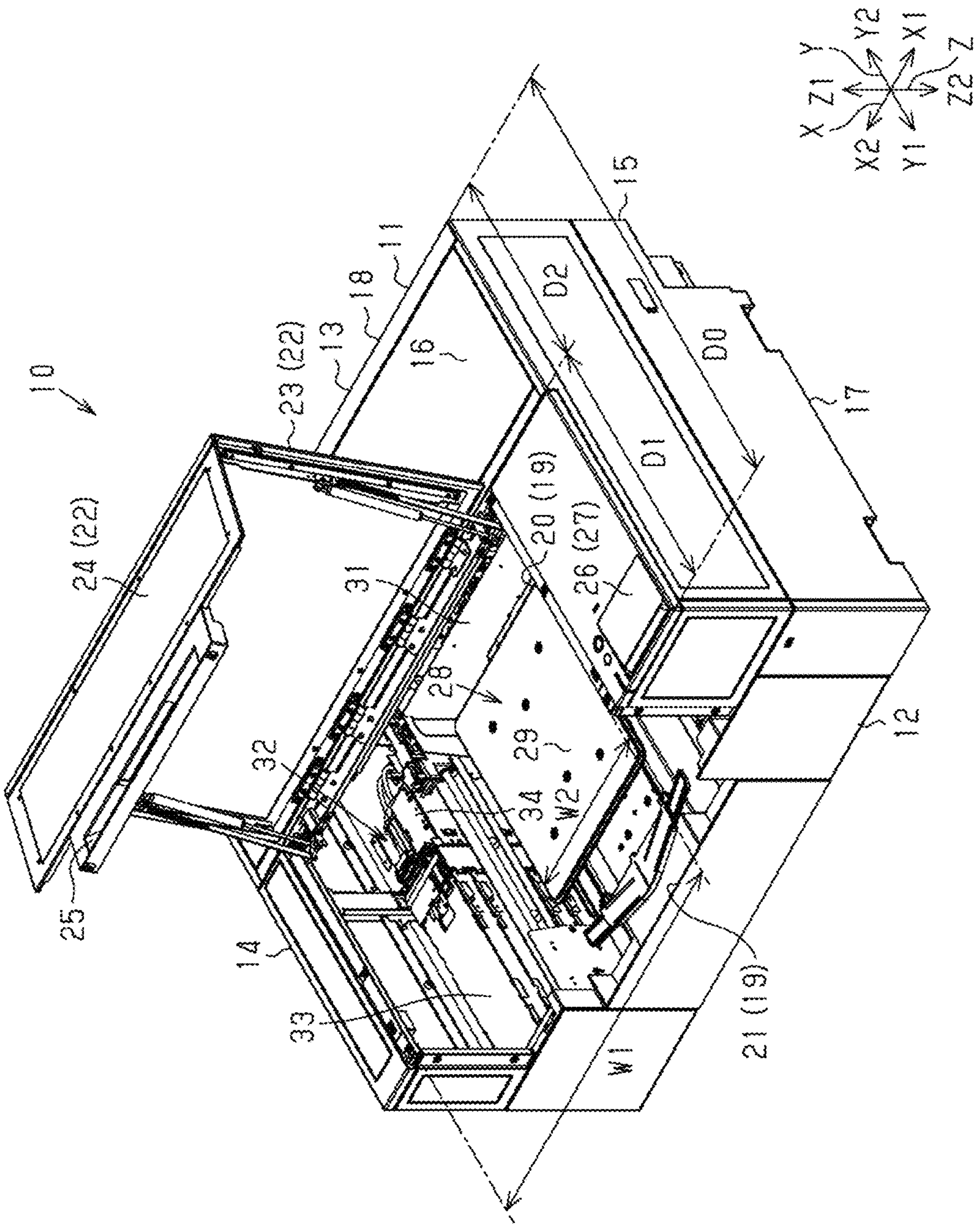
FIG. 2 is a perspective view illustrating the printing apparatus.
Figure 3:
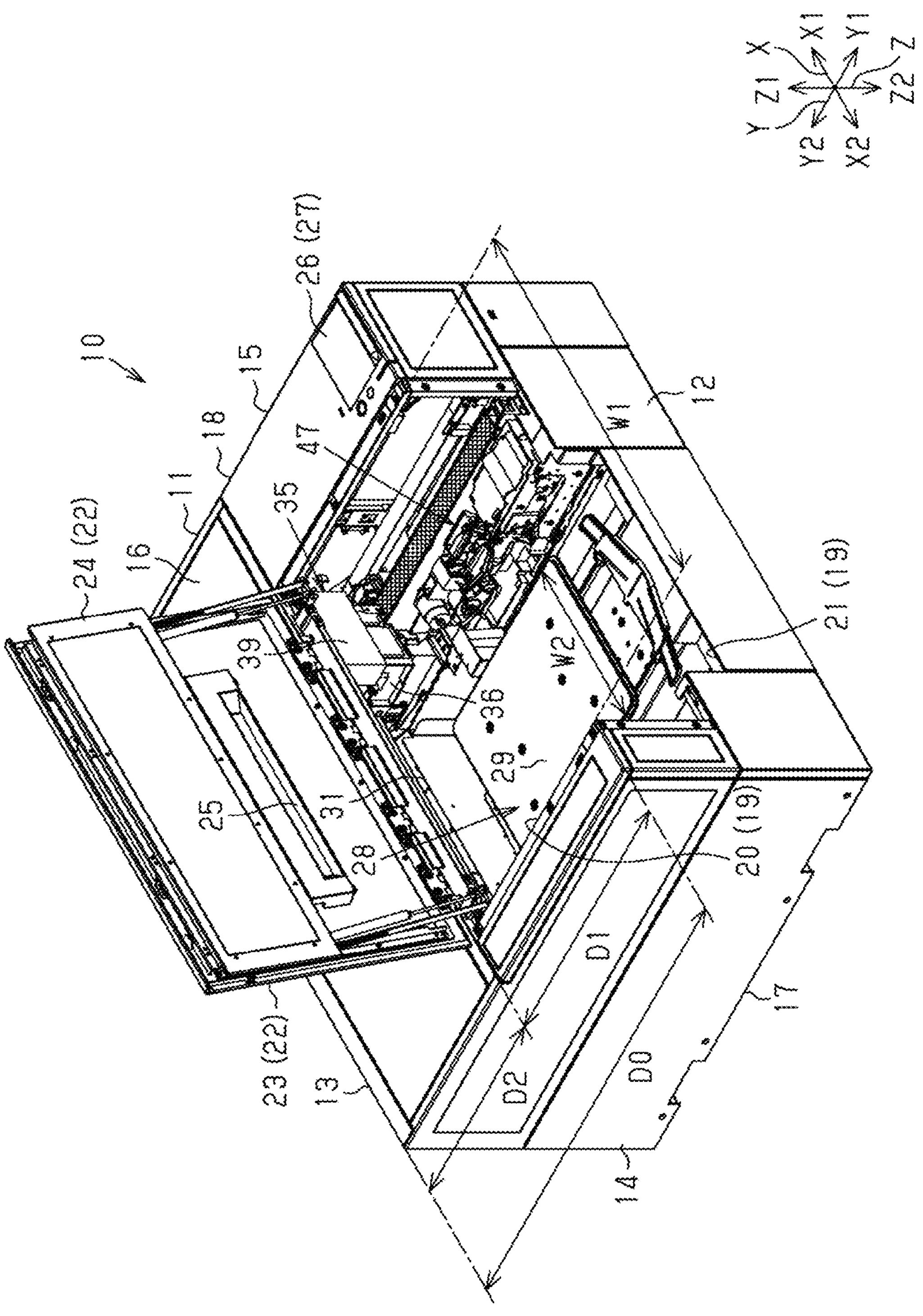
FIG. 3 is a perspective view illustrating the printing apparatus.

As illustrated in FIG. 2 and FIG. 3, the housing 11 is configured to accommodate various members included in the printing apparatus 10. In particular, the housing 11 accommodates a medium support unit 28, a liquid supply unit 32, a printing unit 35, and a maintenance unit 47, which will be described later.

The housing 11 is provided with a housing frame 18. The housing frame 18 constitutes an exterior of the housing 11. The housing frame 18 is provided with an opening 19. That is, the housing 11 is provided with the opening 19. The opening 19 is configured to expose the various members accommodated in the housing 11. In particular, the opening 19 is configured to expose a support surface 29 of the medium support unit 28 to be described below.

The opening 19 is provided with a first opening 20 and a second opening 21. The first opening 20 is provided at the top surface 16. The second opening 21 is provided at the front surface 12. The first opening 20 and the second opening 21 are provided so as to be continuous with each other. That is, the opening 19 is provided across the top surface 16 and the front surface 12.

Figure 4:
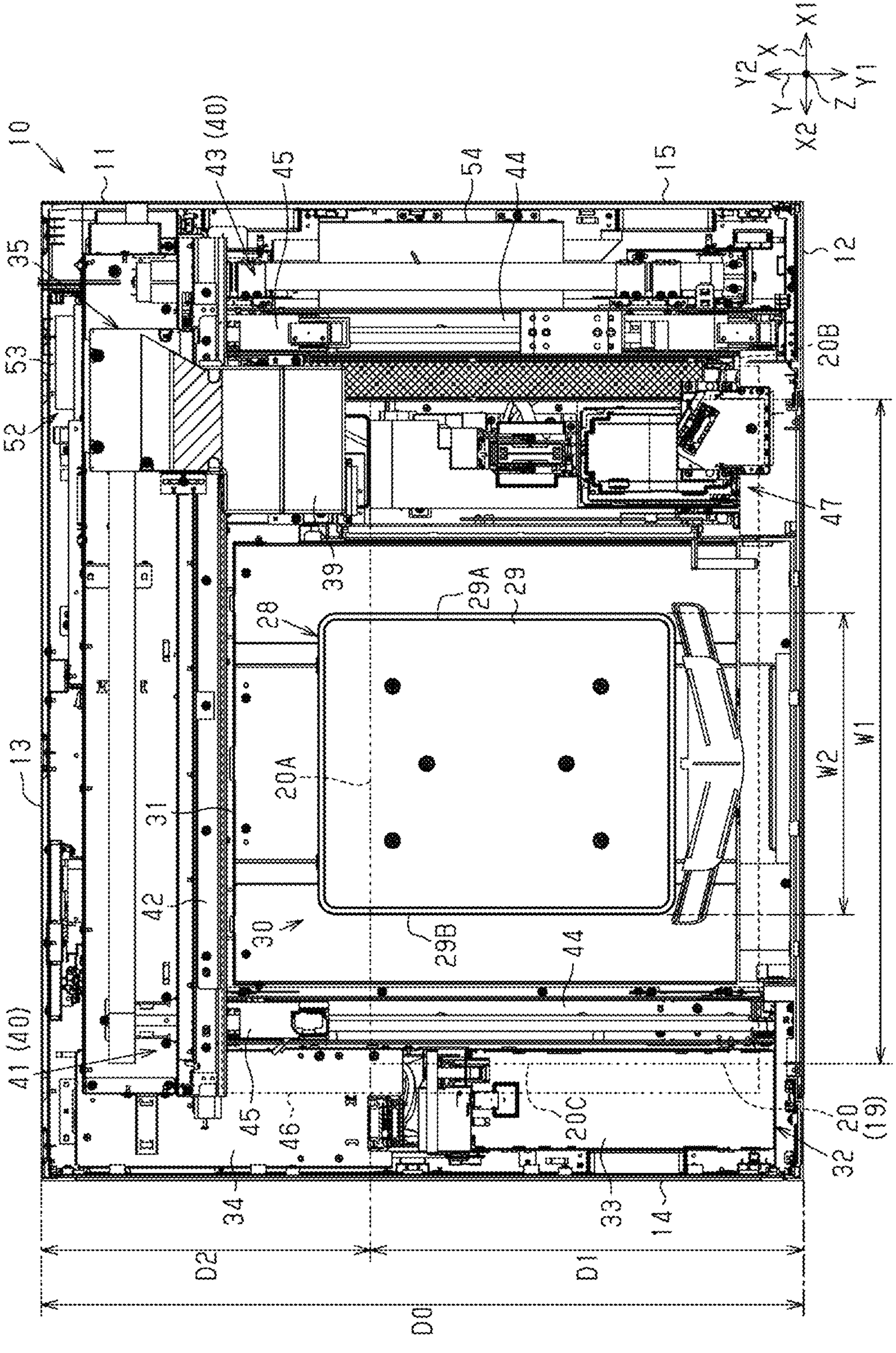
FIG. 4 is a top surface view illustrating the printing apparatus.

As illustrated in FIG. 4, in plan view, the first opening 20 is open between the front surface 12 and a first position 20A in the front-rear direction Y. The first position 20A is a position separated from the front surface 12 to the rear side Y2 by a first distance D1. The first position 20A is a position separated from the back surface 13 by a second distance D2. The first distance D1 is longer than the second distance D2. In other words, the first position 20A is closer to the back surface 13 than to the front surface 12 in the front-rear direction Y. When a distance between the front surface 12 and the back surface 13 in the front-rear direction Y is denoted by D0, the first distance D1 is longer than half of the distance D0.

In plan view, the first opening 20 is open between a second position 20B and a third position 20C in the width direction X. In plan view, the first opening 20 is open over a first width W1 in the width direction X. The first width W1 is longer than a second width W2 of the support surface 29. In this way, when viewed from the upper side Z1, the first opening 20 has a rectangular shape longer than the support surface 29 in the width direction X.

In particular, when viewed from the upper side Z1, the second position 20B is located further to the first width direction X1 side than a first side end 29A of the support surface 29. The first side end 29A is an end of the support surface 29 in the first width direction X1. When viewed from the upper side Z1, the third position 20C is located further to the second width direction X2 side than a second side end 29B of the support surface 29. The second side end 29B is an end of the support surface 29 in the second width direction X2. As described above, when viewed from the upper side Z1, the first opening 20 is open to positions on the outside of the first side end 29A and the second side end 29B in the width direction X.

As illustrated in FIG. 2 and FIG. 3, the housing 11 is provided with an opening/closing cover 22. The opening/closing cover 22 can open and close the opening 19. The opening/closing cover 22 may be constituted by a sheet metal to secure rigidity. The opening/closing cover 22 is provided with a first opening/closing cover 23. The first opening/closing cover 23 has a flat plate shape. The first opening/closing cover 23 can open and close the first opening 20.

The opening/closing cover 22 is provided with a second opening/closing cover 24. The second opening/closing cover 24 has a flat plate shape. The second opening/closing cover 24 can open and close the second opening 21. The second opening/closing cover 24 is provided with a grip portion 25. The grip portion 25 can be gripped by the user. The grip portion 25 is provided at a leading end of the second opening/closing cover 24 to be described later.

The printing apparatus 10 is provided with a display unit 26 and an operation unit 27. The display unit 26 is configured to display information. The operation unit 27 is configured to be operable by the user. The display unit 26 and the operation unit 27 may be integrally configured as a touch panel, or may be separately configured. The display unit 26 and the operation unit 27 are provided on the top surface 16, but are not limited thereto.

Medium Support Unit 28

Figure 5:
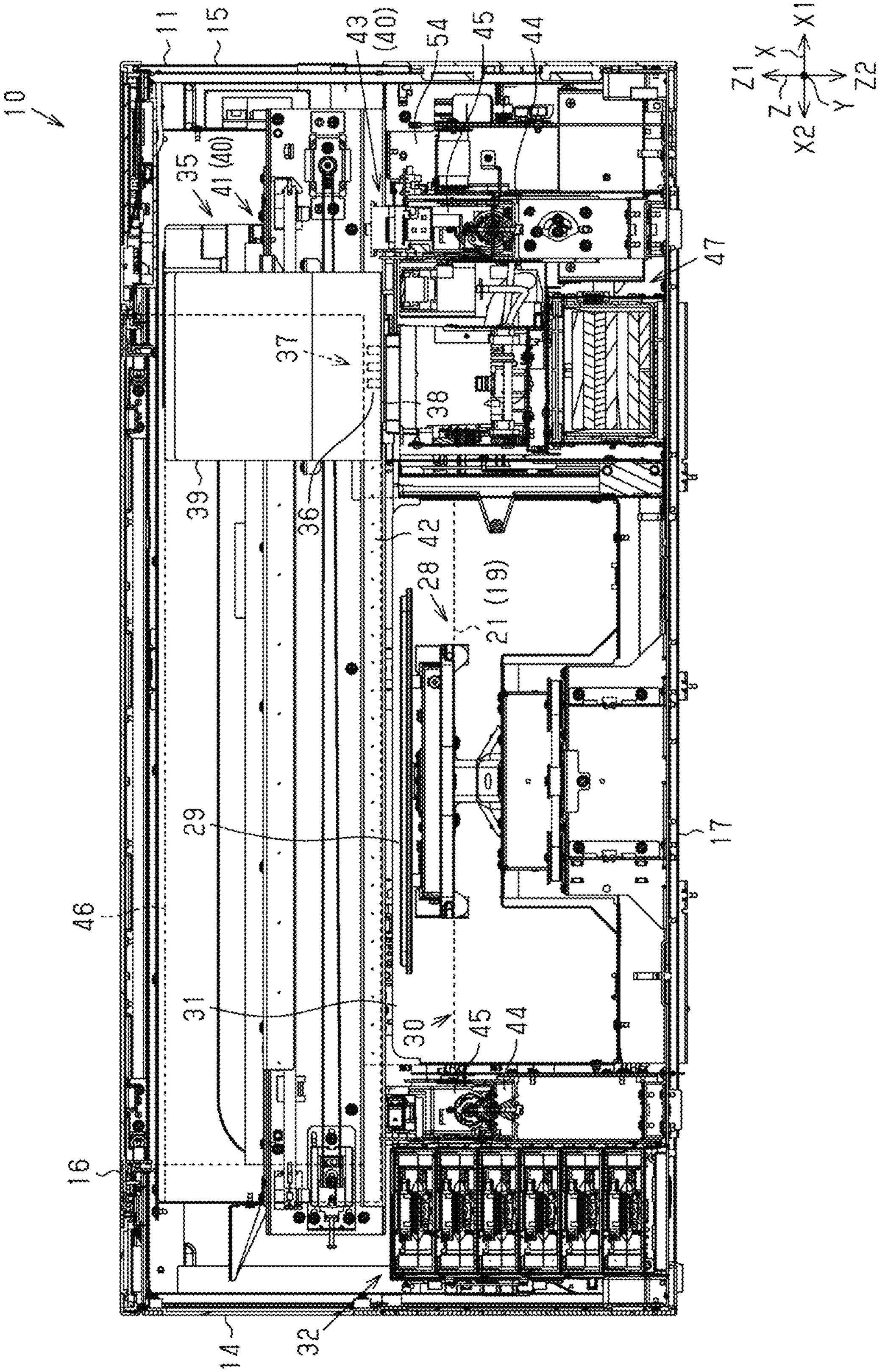
FIG. 5 is a top surface view illustrating the printing apparatus.

As illustrated in FIG. 4 and FIG. 5, the printing apparatus 10 is provided with the medium support unit 28. The medium support unit 28 is configured to support the medium. The medium support unit 28 includes the support surface 29. The support surface 29 is a surface facing the upper side Z1. The support surface 29 is configured to support the medium. In particular, the support surface 29 is the surface that supports at least the printing region of the medium.

The medium support unit 28 is configured not to move in the horizontal direction parallel to the support surface 29. In other words, the support surface 29 is configured not to move in the horizontal direction. The medium support unit 28 can adjust the position of the support surface 29 in the vertical direction Z.

The printing apparatus 10 is provided with a medium accommodation unit 30. The medium accommodation unit 30 is housed in the housing 11. The medium accommodation unit 30 is provided in at least the width direction X of the support surface 29, and may also be provided in the front-rear direction Y. When a partial region of the medium is supported by the support surface 29, the medium accommodation unit 30 can accommodate a partial region of the medium that is not supported by the support surface 29.

In particular, the medium accommodation unit 30 is provided with an accommodation tray 31. The medium accommodation unit 30 includes regions partitioned by the accommodation tray 31. The accommodation tray 31 may define the medium accommodation unit 30 at least at the rear side Y2 of the support surface 29.

Liquid Supply Unit 32

The printing apparatus 10 is provided with the liquid supply unit 32. The liquid supply unit 32 is provided further in the second width direction X2 than the medium support unit 28 and the medium accommodation unit 30. The liquid supply unit 32 may be provided along an inner wall surface of the left side surface 14. The liquid supply unit 32 is configured to supply the liquid to a head 36 to be described below.

The liquid supply unit 32 is provided with a liquid storage unit 33 and a liquid supply driving unit 34. The liquid storage unit 33 is configured to store the liquid supplied to the head 36. The liquid storage unit 33 may be a detachable cartridge, or may be a tank that can be replenished with the liquid. The top surface of the liquid storage unit 33 may be a flat surface.

The liquid supply driving unit 34 is driven to supply the liquid stored in the liquid storage unit 33 to the head 36. The liquid supply driving unit 34 may include a liquid supply pump. The top surface of the liquid supply driving unit 34 may be a flat surface.

Printing Unit 35

The printing apparatus 10 is provided with the printing unit 35. The printing unit 35 is configured to perform printing on the medium. In particular, the printing unit 35 is configured to perform the printing on the medium supported by the support surface 29.

The printing unit 35 is provided with the head 36. The head 36 can eject the liquid onto the medium supported by the support surface 29. The head 36 is provided with a plurality of nozzles 37 and a nozzle surface 38. The nozzle surface 38 is a surface facing the lower side Z2. The nozzle surface 38 is a surface at which each of the plurality of nozzles 37 opens. Each of the plurality of nozzles 37 can eject the liquid.

The printing unit 35 is provided with a carriage 39. The carriage 39 is configured to support the head 36. The head 36 is configured as a serial type, but may be configured as a line type. In the serial type, the printing is performed while the head 36 moves in the width direction X. In the line type, the head 36 is provided over the width direction X.

The printing unit 35 is provided with a head moving unit 40. The head moving unit 40 is configured to move the carriage 39. In other words, the head moving unit 40 is configured to move the head 36. The head moving unit 40 is configured to move the head 36 in the horizontal direction. Specifically, the head moving unit 40 is configured to move the head 36 in the width direction X and the front-rear direction Y.

The head moving unit 40 is provided with a first head moving unit 41. The first head moving unit 41 is configured to move the carriage 39 in the width direction X. In other words, the first head moving unit 41 is configured to move the head 36 in the width direction X.

The first head moving unit 41 is provided with a first guide portion 42. The first guide portion 42 is configured to extend in the width direction X over the support surface 29. The first guide portion 42 guides the carriage 39 so as to be movable along the width direction X.

The head moving unit 40 is provided with a second head moving unit 43. The second head moving unit 43 is configured to support the first head moving unit 41. The second head moving unit 43 is configured to move the first head moving unit 41 in the front-rear direction Y. In other words, the second head moving unit 43 is configured to move the head 36 in the front-rear direction Y. When the head 36 is the line type, the head moving unit 40 need not necessarily be provided with the first head moving unit 41 and may be provided with only the second head moving unit 43.

The second head moving unit 43 is provided with a pair of second guide portions 44. The pair of second guide portions 44 are provided in the first width direction X1 and the second width direction X2 of the medium support unit 28, with the medium support unit 28 interposed therebetween. Each of the pair of second guide portions 44 is configured to extend in the front-rear direction Y.

The second head moving unit 43 is provided with a pair of support portions 45. The pair of support portions 45 are provided in the first width direction X1 and the second width direction X2 of the medium support unit 28, with the medium support unit 28 interposed therebetween. Each of the pair of support portions 45 is configured to support the first head moving unit 41. The pair of support portions 45 are movable in the front-rear direction Y along the corresponding pair of second guide portions 44. In this manner, the head moving unit 40 carries the head 36, and is movable in the horizontal direction over the medium support unit 28. The head moving unit 40 is configured in a gate shape in a front view.

The head moving unit 40 can move the head 36 within a movement range 46. The movement range 46 of the head 36 includes a facing position and retracted positions. The facing position is a position at which the nozzle surface 38 faces the support surface 29. The retracted positions are positions at which the nozzle surface 38 does not face the support surface 29. The retracted positions include a standby position. The standby position is a position at which the head 36 is disposed when the printing is not performed. The standby position may be positioned on the first width direction X1 side and the rear side Y2 side in the movement range 46. Further, the retracted positions include a maintenance position. The maintenance position is a position at which the nozzle surface 38 faces the maintenance unit 47 to be described later. In other words, the movement range 46 of the head 36 includes the maintenance position.

Maintenance Unit 47

The printing apparatus 10 is provided with the maintenance unit 47. The maintenance unit 47 is provided further in the first width direction X1 in than the medium support unit 28 and the medium accommodation unit 30. The maintenance unit 47 is disposed at a position that does not overlap the medium support unit 28 and the medium accommodation unit 30 in the vertical direction Z. The maintenance unit 47 is configured to perform maintenance of the head 36.

Control Board 52 and Power Supply Unit 54

As illustrated in FIG. 4, the printing apparatus 10 is provided with a control board 52. The control board 52 is accommodated in the housing 11. The control board 52 may be provided along the inner wall surface of the back surface 13. The control board 52 is a board on which various electronic components for controlling the printing apparatus 10 are mounted.

The control board 52 is provided with a control unit 53. The control unit 53 controls the printing apparatus 10. The control unit 53 controls various operations executed by the printing apparatus 10. The control unit 53 may be configured as a circuit including α: one or more processors that perform various processes according to a computer program, β: one or more dedicated hardware circuits that perform at least some of the various processes, or γ: a combination thereof. The hardware circuit is, for example, an application-specific integrated circuit. A processor includes a CPU and a memory such as a RAM and a ROM which stores program code or instructions configured to cause the CPU to perform processes. The memory, that is, a computer-readable medium, includes any readable medium that can be accessed by a general purpose or special purpose computer.

The printing apparatus 10 is provided with a power supply unit 54. The power supply unit 54 is accommodated in the housing 11. The power supply unit 54 may be provided along the inner wall surface of the right side surface 15. The power supply unit 54 is configured to supply power to the printing apparatus 10.

Electrical Configuration of Printing Apparatus 10

Next, the electrical configuration of the printing apparatus 10 will be described with reference to FIG. 6.

Figure 6:
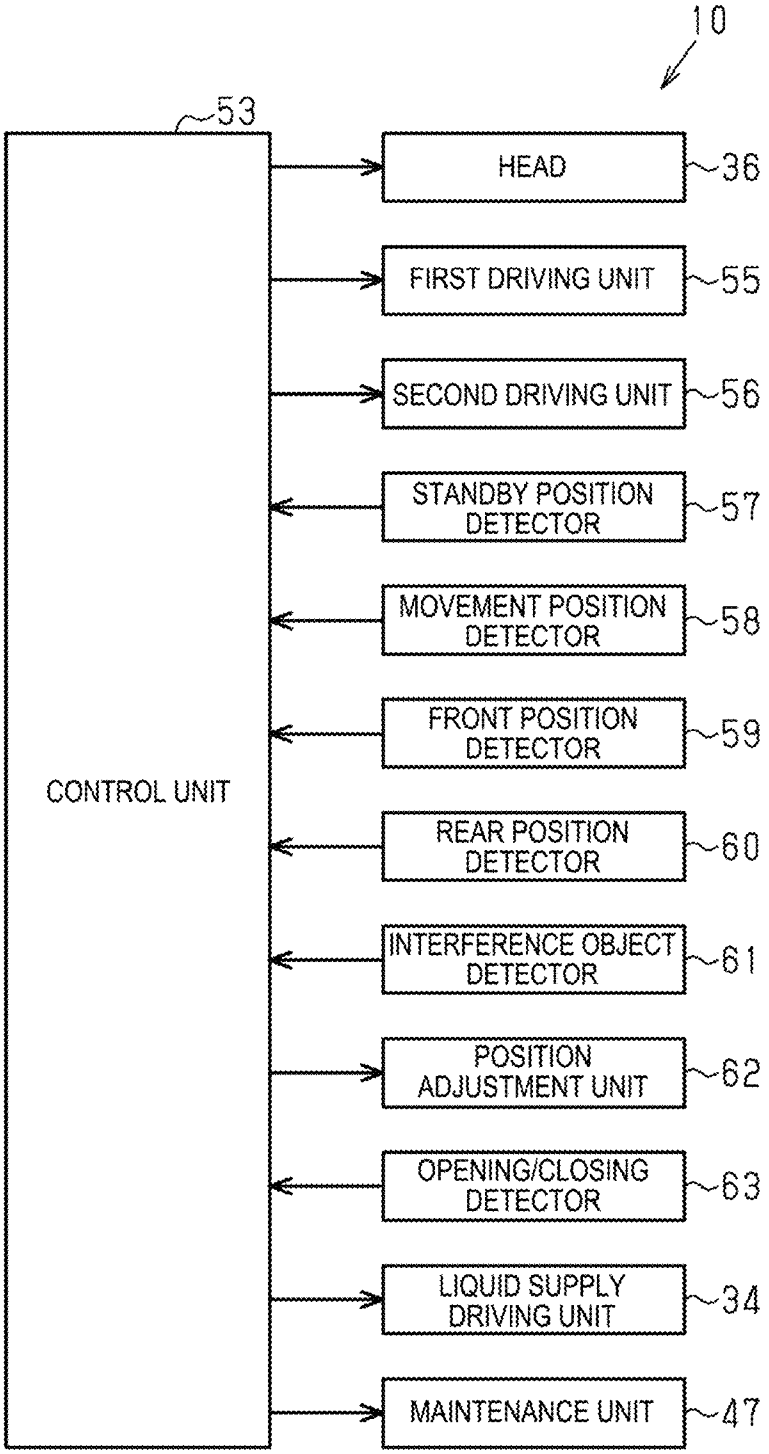
FIG. 6 is a block diagram illustrating an electrical configuration of the printing apparatus.

As illustrated in FIG. 6, the printing apparatus 10 is provided with a first driving unit 55. The first driving unit 55 is a driving source that moves the carriage 39 along the width direction X. The first driving unit 55 may be provided at the first head moving unit 41.

The printing apparatus 10 is provided with a second driving unit 56. The second driving unit 56 is a driving source that moves the first head moving unit 41 along the front-rear direction Y. The second driving unit 56 may be provided at the second head moving unit 43.

The printing apparatus 10 is provided with a standby position detector 57. The standby position detector 57 can detect that the head 36 is disposed at the standby position. The standby position detector 57 may be provided at the first head moving unit 41.

The printing apparatus 10 is provided with a movement position detector 58. The movement position detector 58 can detect the position at which the head 36 moving in the width direction X is disposed. The movement position detector 58 may be provided at the first head moving unit 41.

The printing apparatus 10 is provided with a front position detector 59. The front position detector 59 can detect that the head 36 is disposed at a front-most position. The front position detector 59 may be provided at the second head moving unit 43.

The printing apparatus 10 is provided with a rear position detector 60. The rear position detector 60 can detect that the head 36 is disposed at a rear-most position. The rear position detector 60 may be provided in the second head moving unit 43.

The printing apparatus 10 is provided with an interference object detector 61. The interference detector 61 can detect an object of interference with the head 36. The interference object detector 61 may be provided in the second head moving unit 43. The interference object detector 61 may be provided with a light projecting portion and a light receiving portion (not illustrated). The light projecting portion and the light receiving portion are provided in the pair of second guide portions 44.

The printing apparatus 10 is provided with a position adjustment unit 62. The position adjustment unit 62 is configured to adjust the position of the support surface 29 in the vertical direction Z. The position adjustment unit 62 may be provided in the medium support unit 28. The position adjustment unit 62 may be configured to adjust the position of the accommodation tray 31 in the vertical direction Z.

The printing apparatus 10 is provided with an opening/closing detector 63. The opening/closing detector 63 can detect an opening/closing state of the first opening/closing cover 23. That is, the opening/closing detector 63 can detect the opening/closing state of the opening/closing cover 22. The opening/closing detector 63 is provided on the inner wall surface of the top surface 16, but is not limited thereto.

The control unit 53 is coupled to the head 36, the first driving unit 55, the second driving unit 56, the position adjustment unit 62, the liquid supply driving unit 34, and the maintenance unit 47. The control unit 53 supplies drive signals to control the head 36, the first driving unit 55, the second driving unit 56, the position adjustment unit 62, the liquid supply driving unit 34, and the maintenance unit 47.

The control unit 53 is coupled to the standby position detector 57, the movement position detector 58, the front position detector 59, the rear position detector 60, the interference object detector 61, and the opening/closing detector 63. The control unit 53 can receive detection signals from the standby position detector 57, the movement position detector 58, the front position detector 59, the rear position detector 60, the interference object detector 61, and the opening/closing detector 63.

The control unit 53 performs various types of control based on the detection signals. As a specific example, the control unit 53 may stop the printing when the opening/closing detector 63 detects that the opening/closing cover 22 is opened while the printing is being performed.

Detailed Configuration of Medium Support Unit 28

Next, a detailed configuration of the medium support unit 28 will be described.

Figure 7:
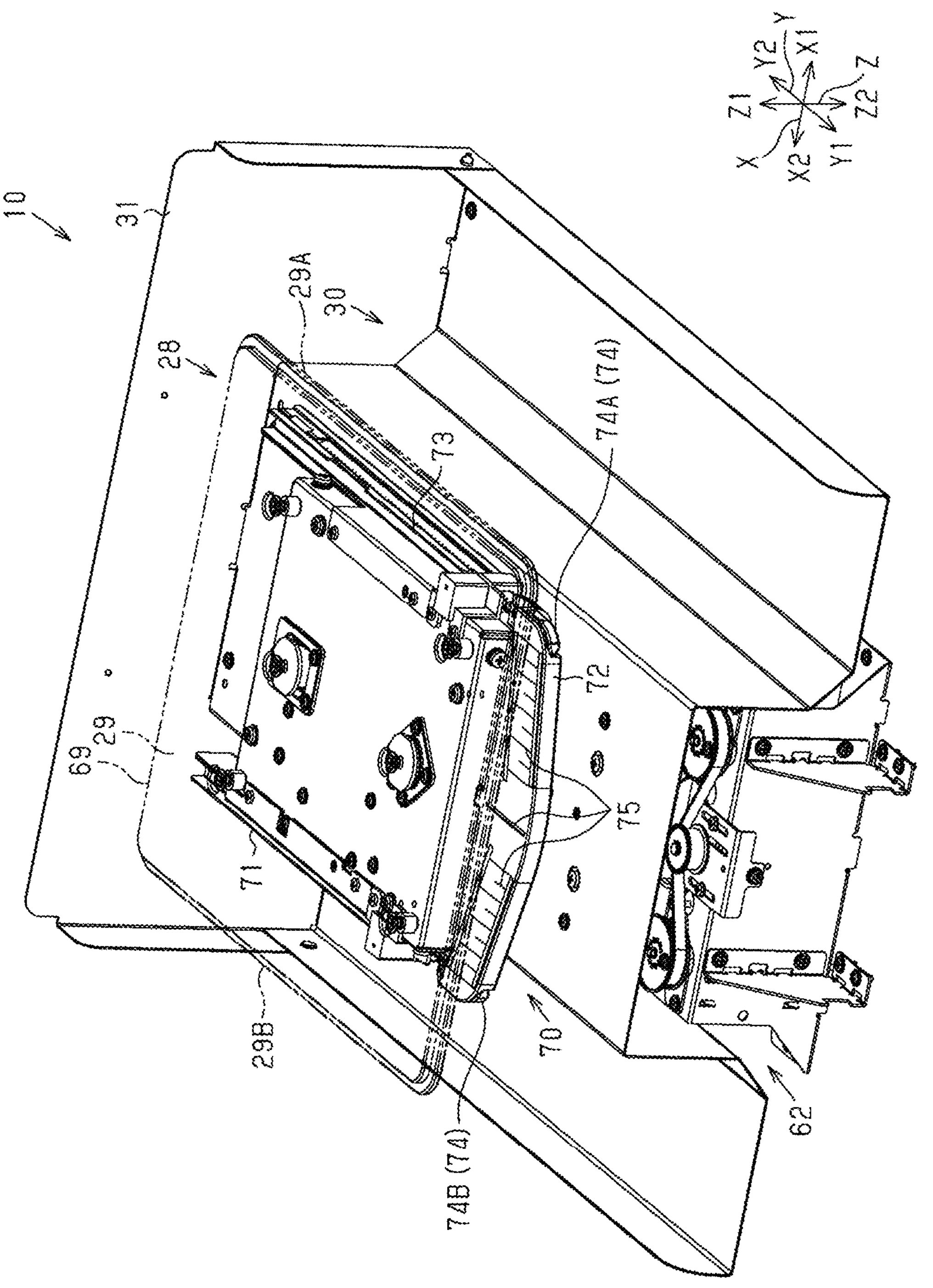
FIG. 7 is a perspective view illustrating a medium support unit.

As illustrated in FIG. 7, the medium support unit 28 is provided with a tray 69 and a tray support portion 70. The tray 69 may be constituted by a light-transmissive member. In the drawings, the tray 69 is sometimes indicated by a two dot chain line. The tray 69 includes the support surface 29. In other words, the tray 69 is configured to support the medium. The tray 69 may have a rectangular shape. The lengthwise direction of the tray 69 may be the front-rear direction Y.

The tray support portion 70 is configured to support the tray 69 from the lower side Z2 side. The tray support portion 70 is provided with a main body portion 71. The main body portion 71 is configured to support the tray 69.

The tray support portion 70 is provided with a positioning portion 72. The positioning portion 72 is positioned to the front side Y1 of the tray 69. The positioning portion 72 is configured to determine a placement position of the medium with respect to the tray 69. In particular, the positioning portion 72 is configured to determine the placement position of the medium in the front-rear direction Y with respect to the tray 69. The positioning portion 72 has a line-symmetric shape with respect to a predetermined direction parallel to the support surface 29. In the embodiment, the predetermined direction parallel to the support surface 29 is the front-rear direction Y.

Figure 8:
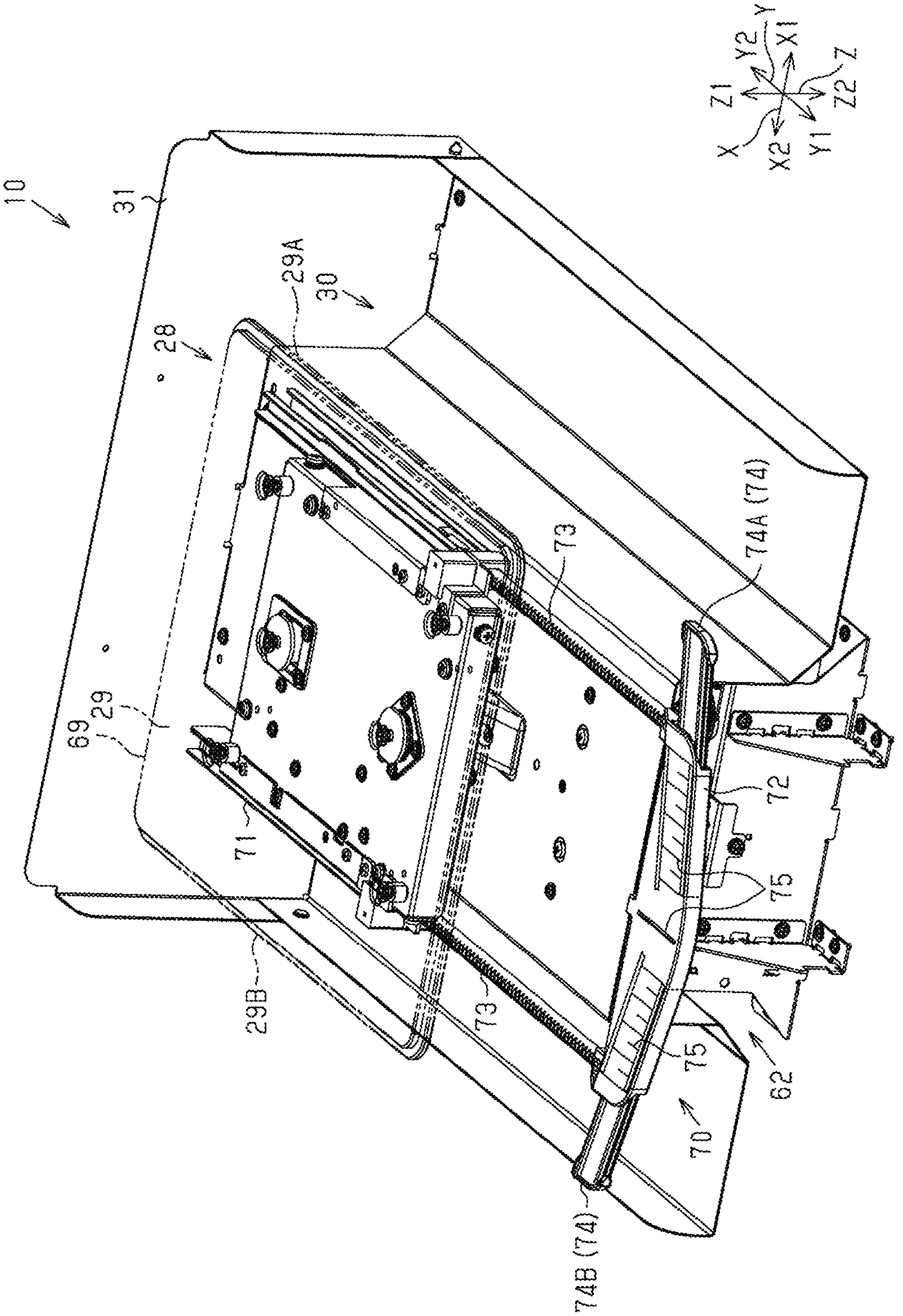
FIG. 8 is a perspective view illustrating the medium support unit.

As illustrated in FIG. 8, the positioning portion 72 is provided with a position changing portion 73. In particular, the positioning portion 72 may include a pair of the position changing portions 73. The position changing portions 73 can be extended and contracted in the front-rear direction Y with respect to the main body portion 71. One of the pair of position changing portions 73 is provided along the first side end 29A. The other of the pair of position changing portions 73 is provided along the second side end 29B.

The position changing portions 73 can change the position of the positioning portion 72 with respect to the main body portion 71. In other words, the position changing portions 73 can change the placement position of the medium with respect to the tray 69. In particular, the position changing portions 73 can change the placement position of the medium with respect to the tray 69 in the front-rear direction Y.

The positioning portion 72 is provided with an extending/contracting portion 74. The extending/contracting portion 74 can extend and contract in accordance with the shape of the medium. The extending/contracting portion 74 can be extended and contracted in an extending/contracting direction parallel to the support surface 29. In the embodiment, the extending/contracting direction parallel to the support surface 29 is a direction including a component in the width direction X, and the extending/contracting portion 74 can extend and contract in the direction including the component in the width direction X.

The extending/contracting portion 74 includes a first extending/contracting portion 74A and a second extending/contracting portion 74B. The first extending/contracting portion 74A is configured to extend so as to be able to project from the first side end 29A in the first width direction X1. The second extending/contracting portion 74B is configured to extend so as to be able to project from the second side end 29B in the second width direction X2.

The positioning portion 72 is provided with a positioning reference portion 75. The positioning reference portion 75 is disposed at a central position in the front-rear direction Y. Accordingly, when placing the medium on the support surface 29, a reference position, which is the center of the medium indicated by the positioning reference portion 75, can be visually recognized.

Further, the positioning reference portions 75 are disposed at positions that are line-symmetrical with respect to the front-rear direction Y. In this way, when placing the medium on the support surface 29, the reference position of the medium in the width direction X indicated by the positioning reference portions 75 can be visually recognized.

Here, the tray support portion 70 will be described.

Figure 9:
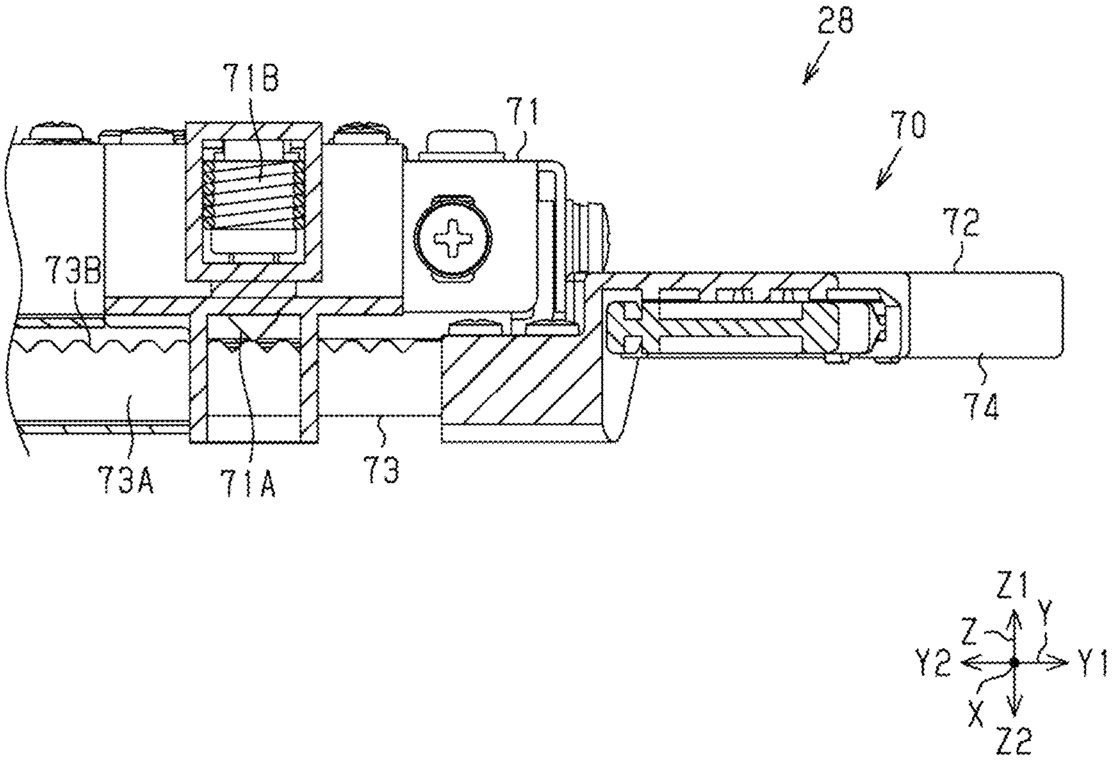
FIG. 9 is a cross-sectional view illustrating a tray support unit.

As illustrated in FIG. 9, in the tray support portion 70, the main body portion 71 is provided with a main body engaging portion 71A and an urging member 71B. The main body engaging portion 71A can move along the vertical direction Z. The urging member 71B urges the main body engaging portion 71A to the lower side Z2. The urging member 71B may be a coil spring.

The position changing portion 73 is provided with a slide guide portion 73A and position changing engaging portions 73B. The slide guide portion 73A is configured to extend in the front-rear direction Y. The slide guide portion 73A is coupled to the positioning portion 72 at the front side Y1. The slide guide portion 73A can engage with the main body portion 71 at the rear side Y2. In this way, the slide guide portion 73A can change the position of the positioning portion 72 with respect to the main body portion 71.

The position changing engaging portions 73B are positioned at the upper side Z1 of the slide guide portion 73A. The position changing engaging portions 73B are positioned to the lower side Z2 of the main body engaging portion 71A. The position changing engaging portions 73B are configured to be able to engage with the main body engaging portion 71A. The position changing engaging portions 73B may be a plurality of groove portions provided at a predetermined interval in the front-rear direction Y. In this manner, the position changing engaging portions 73B are configured to engage with the main body portion 71 at the predetermined interval. Using the position changing engaging portions 73B, the position changing portion 73 can change the positions of the main body portion 71 and of the positioning portion 72 at the predetermined interval.

Position Adjustment Unit 62

As illustrated in FIG. 7 and FIG. 8, the tray support portion 70 is provided with the position adjustment unit 62. That is, the medium support unit 28 is provided with the position adjustment unit 62. The position adjustment unit 62 is configured to adjust the position of the main body 71 in the vertical direction Z. In other words, the position adjustment unit 62 is configured to adjust the position of the tray 69 in the vertical direction Z. In this way, the position adjustment unit 62 is configured to adjust the position of the support surface 29 in the vertical direction Z. The position adjustment unit 62 may be configured to adjust the position of the accommodation tray 31 in the vertical direction Z in conjunction with the adjustment of the position of the support surface 29.

In particular, as illustrated in FIG. 5, the position adjustment unit 62 can adjust the support surface 29 to a printing position in the vertical direction Z. The printing position is a position at which the support surface 29 is disposed when the printing is performed. The printing position is a position at which the support surface 29 is disposed outside the movement range 46 of the head 36. The printing position is a position at which the support surface 29 is disposed to the lower side Z2 of the movement range 46 of the head 36. The printing position is also a position at which the accommodation tray 31 does not cover and hide the first guide portion 42 from the front side Y1.

Figure 10:
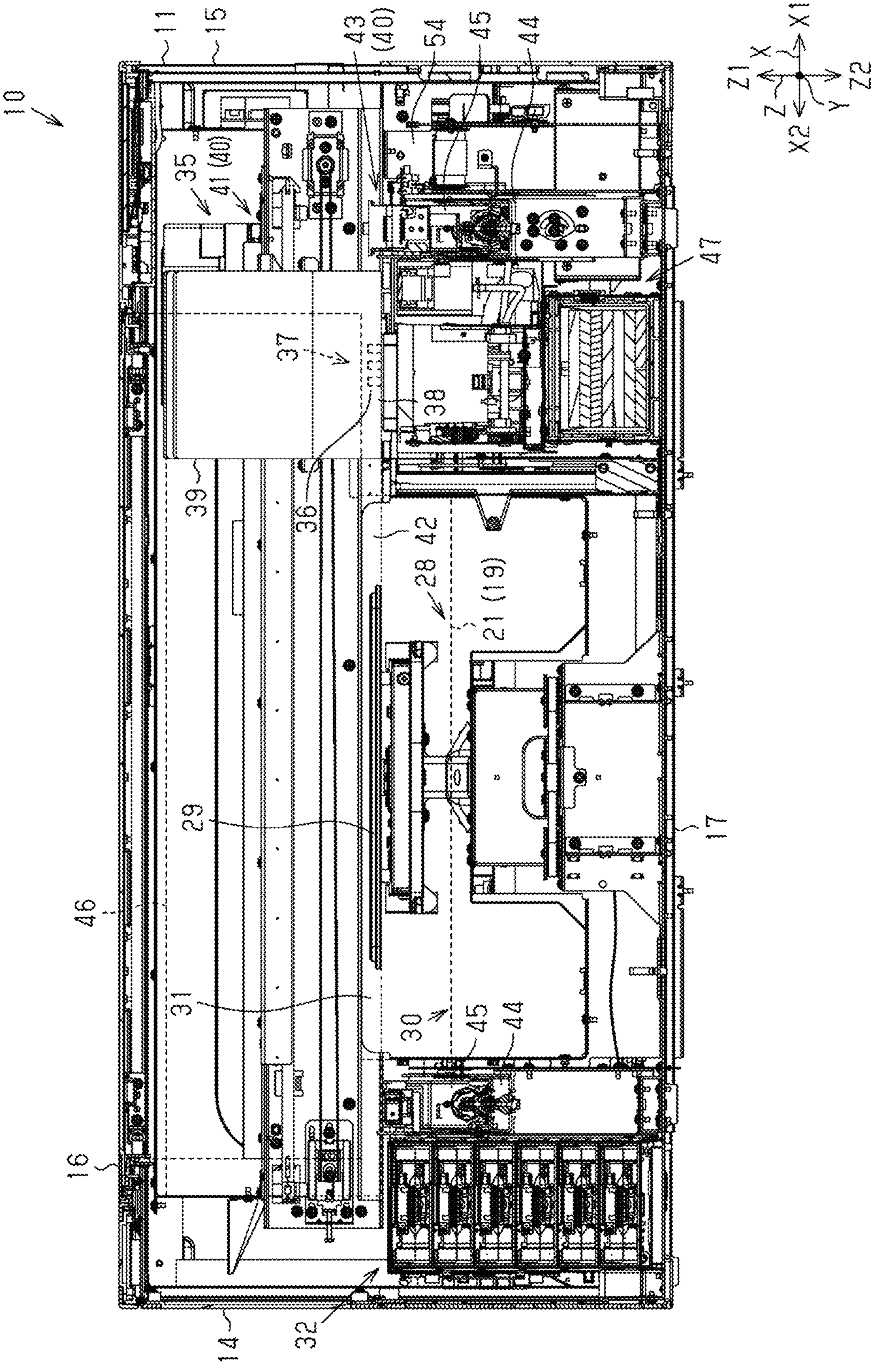
FIG. 10 is a front view illustrating the printing apparatus.

On the other hand, as illustrated in FIG. 10, the position adjustment unit 62 can adjust the support surface 29 to a placement position in the vertical direction Z. The placement position is a position at which the support surface 29 is disposed when the medium can be placed on the support surface 29. The placement position is a position at which the support surface 29 is disposed within the movement range 46 of the head 36. The placement position is a position at which the support surface 29 is disposed when the printing is not performed. The placement position is also a position at which the accommodation tray 31 covers and hides the first guide portion 42 from the front side Y1. Accordingly, when the user places the medium on the support surface 29, the user can be inhibited from touching the first guide portion 42. Grease used in order to move the carriage 39 in the width direction X may be adhered to the first guide portion 42. In this way, when the user places the medium on the support surface 29, it is possible to inhibit the grease from being attached to the hand of the user as a result of the user touching the first guide portion 42, and also to suppress the medium from being contaminated.

Detailed Configuration of Position Adjustment Unit 62

Next, a detailed configuration of the position adjustment unit 62 will be described.

Figure 11:
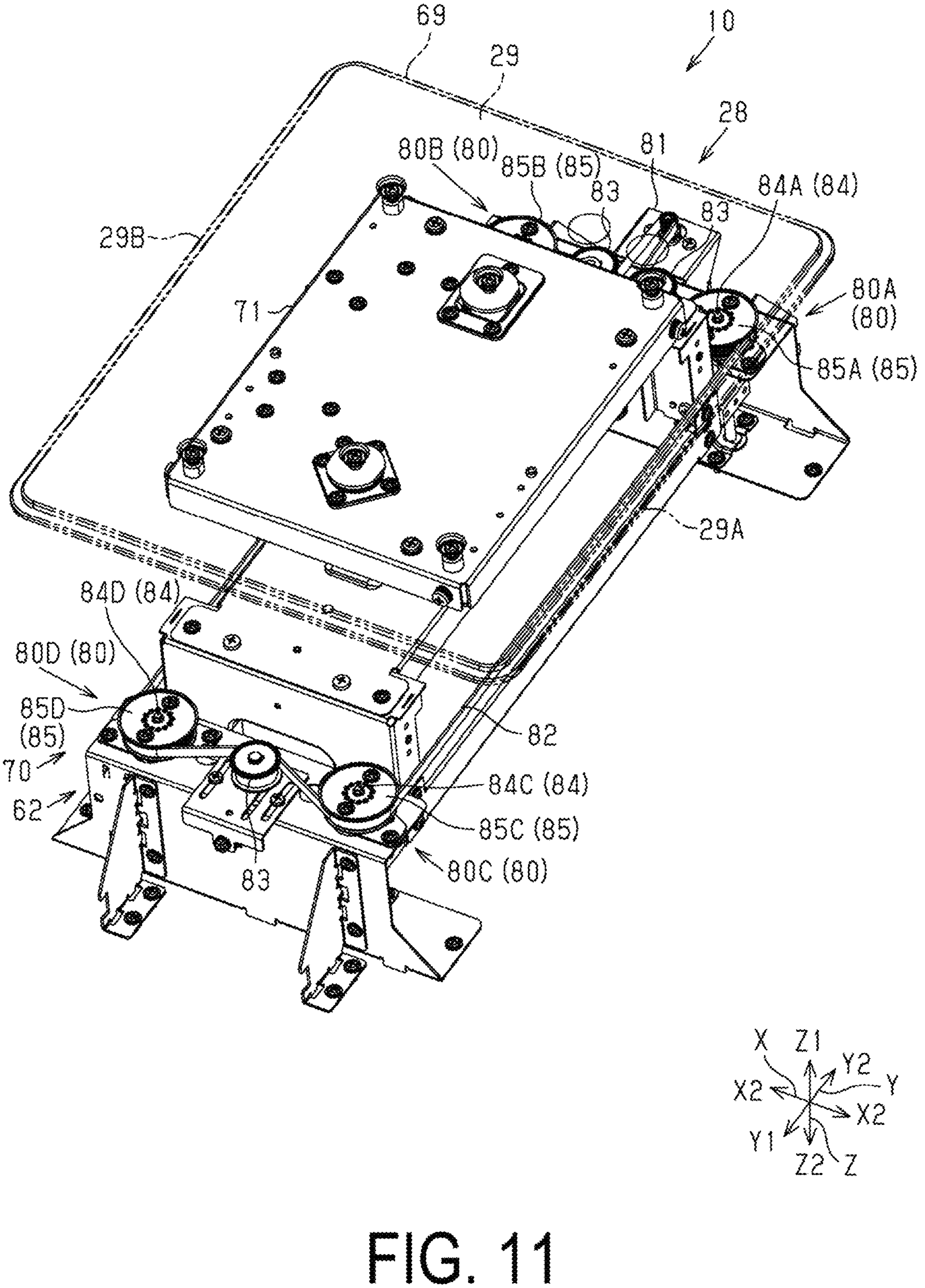
FIG. 11 is a perspective view illustrating the medium support unit.

As illustrated in FIG. 11, the position adjustment unit 62 may be provided with a plurality of position adjustment mechanisms 80. In the drawings, the positioning portion 72 may be omitted in order to facilitate understanding of the invention. The position adjustment unit 62 may be provided with four position adjustment mechanisms 80A to 80D, or may be provided with two, three, or five or more position adjustment mechanisms. Each of the four position adjustment mechanisms 80A to 80D is configured to adjust the position of the support surface 29 in the vertical direction Z. Each of the four position adjustment mechanisms 80A to 80D is provided at a position parallel to the horizontal plane.

Figure 12:
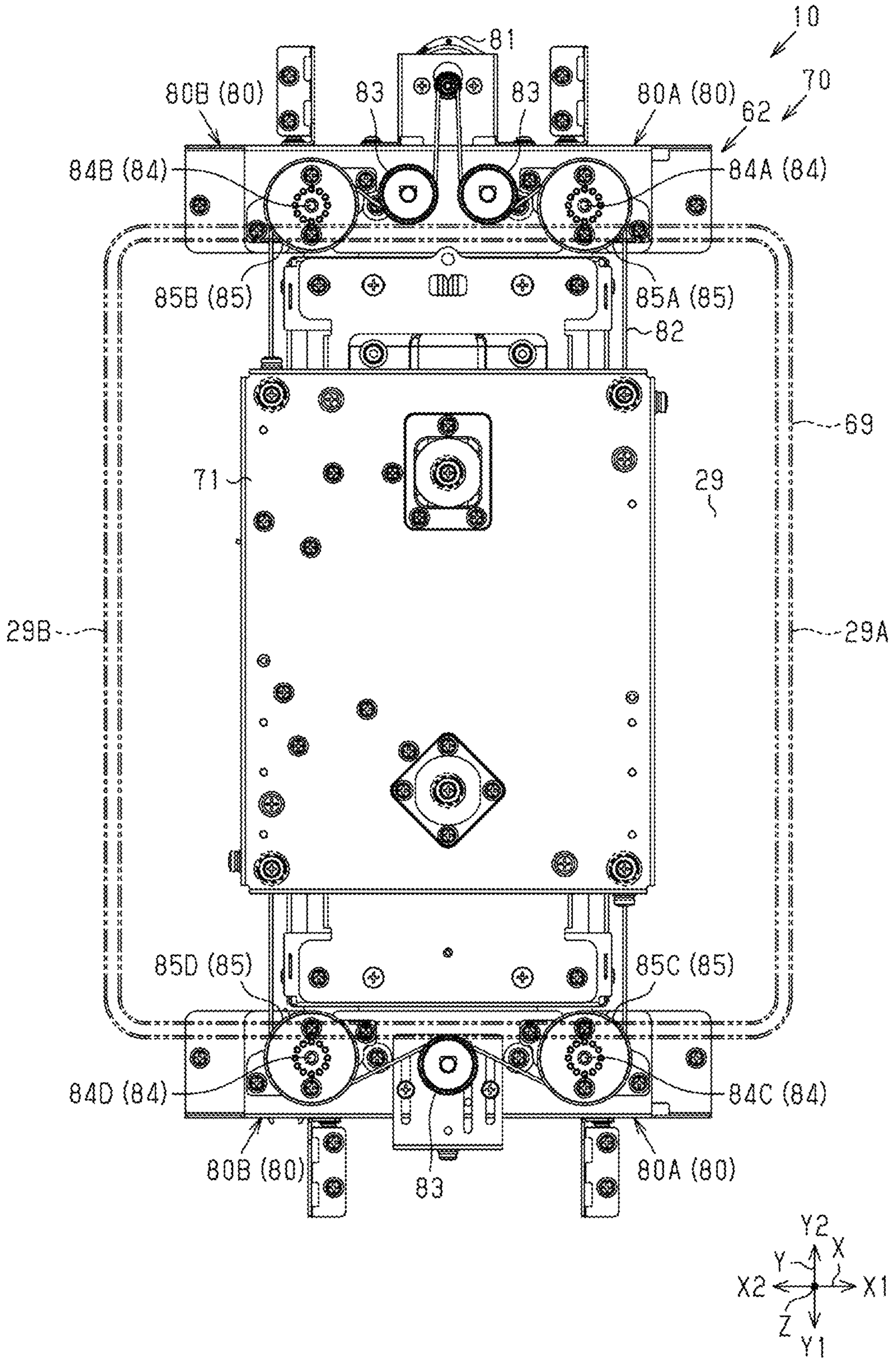
FIG. 12 is a front view illustrating the medium support unit.

As illustrated in FIG. 12, the four position adjustment mechanisms 80A to 80D are respectively provided at positions forming a rectangular shape in plan view. The four position adjustment mechanisms 80A to 80D are respectively provided at positions corresponding to the four corners of the tray 69. The plurality of position adjustment mechanisms 80 are each configured in the same manner. Thus, the one position adjustment mechanism 80A will be described as necessary, as a representative of the plurality of position adjustment mechanisms 80.

The position adjustment unit 62 may be provided with a position adjustment driving unit 81 and a drive belt 82. The position adjustment driving unit 81 is a drive source that drives the drive belt 82. The position adjustment driving unit 81 may be a drive motor that drives the drive belt 82. The position adjustment driving unit 81 includes a motor shaft 81A.

The drive belt 82 is stretched over the motor shaft 81A. The drive belt 82 transmits a driving force from the position adjustment driving unit 81 to each of the four position adjustment mechanisms 80A to 80D, via the motor shaft 81A. In particular, the drive belt 82 transmits the driving force to pulleys 85A to 85D (to be described later) of each of the four position adjustment mechanisms 80A to 80D.

The position adjustment unit 62 may be provided with a power transmission unit 83. The power transmission unit 83 is configured to transmit the power from the position adjustment driving unit 81 to each of the four position adjustment mechanisms 80A to 80D, in conjunction with the driving of the drive belt 82.

Figure 13:
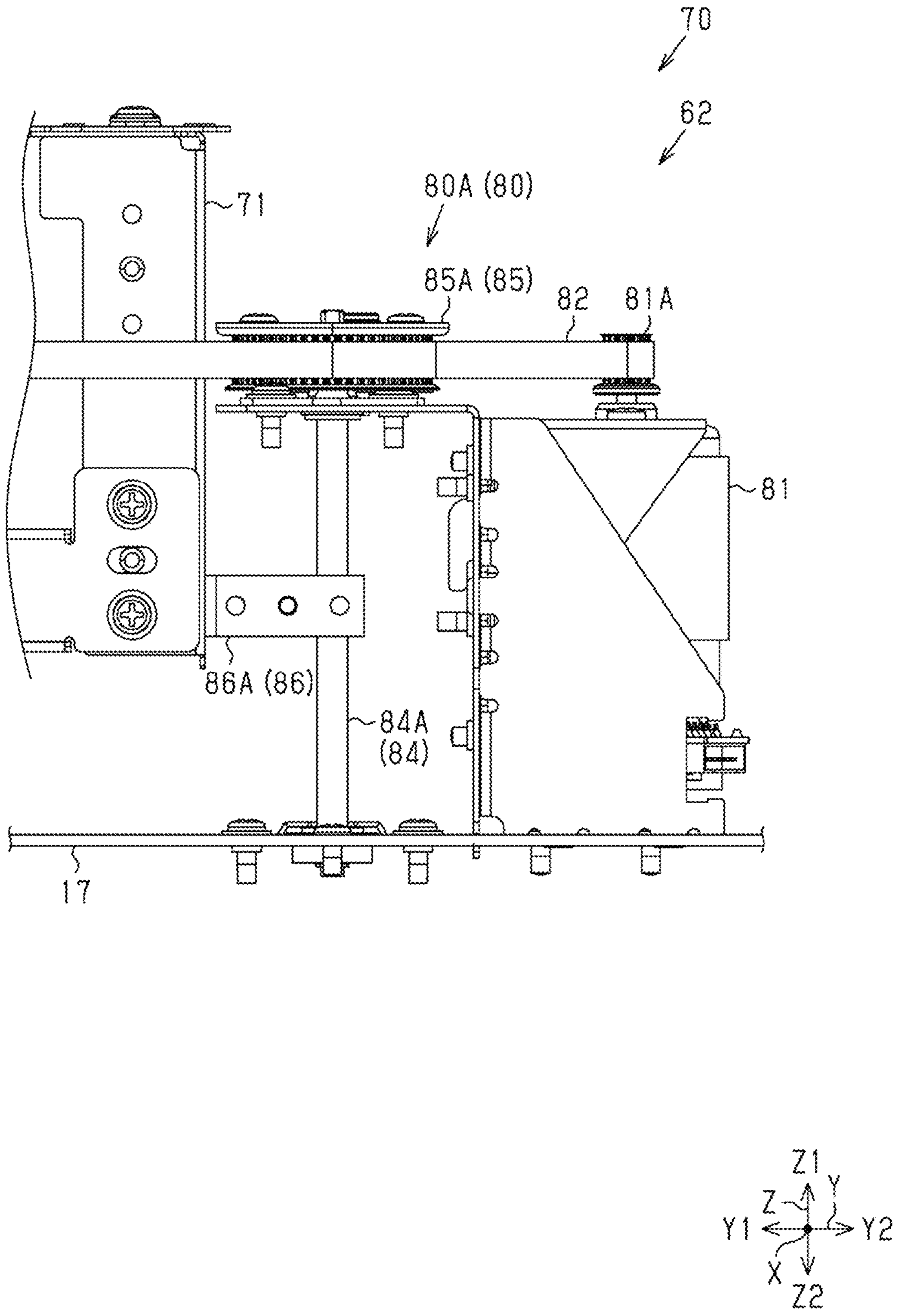
FIG. 13 is a side view illustrating the medium support unit.

As illustrated in FIG. 13, the position adjustment mechanism 80A may be provided with a screw shaft 84A. A lower end of the screw shaft 84A is attached to the bottom surface 17. The screw shaft 84A is attached to the bottom surface 17 so as to extend along the vertical direction Z. The screw shaft 84A is rotatably attached to the bottom surface 17 via bearings (not illustrated).

The position adjustment mechanism 80A may be provided with the pulley 85A. The pulley 85A is coupled to the screw shaft 84A. The pulley 85A is coupled to the upper end of the screw shaft 84A via bearings (not illustrated). When the power is transmitted from the drive belt 82, the pulley 85A rotates together with the screw shaft 84A about a rotation axis extending in the vertical direction Z.

The position adjustment mechanism 80A may be provided with a male thread bush 86A. In other words, each of the plurality of position adjustment mechanisms 80 may be provided with the male thread bush 86. The male thread bush 86A is fixed to the main body portion 71 so as to support the main body portion 71. The male thread bush 86A is screwed together with the screw shaft 84A. The male thread bush 86A raises and lowers the main body portion 71 using the rotation of the screw shaft 84A. Thus, when the power from the drive belt 82 is transmitted to the pulley 85A, the main body portion 71 moves up and down as a result of the male thread bush 86A moving up and down in accordance with the rotation of the screw shaft 84A.

As described above, the position adjustment mechanism 80A is configured to adjust the position of the support surface 29 in the vertical direction Z by rotation of the screw shaft 84A. In particular, the control unit 53 drives the position adjustment driving unit 81 as a result of conditions being satisfied. The position adjustment unit 62 transmits the driving force from the drive belt 82 to all of the pulleys 85A to 85D in accordance with the driving of the position adjustment driving unit 81. In this way, the position adjustment unit 62 can change the position of the support surface 29 in the vertical direction Z, by all the plurality of position adjustment mechanisms 80A to 80D moving in conjunction with each other. Additionally, the position adjustment unit 62 can change the position of the accommodation tray 31 in the vertical direction Z in conjunction with the support surface 29, and can change the position of the medium accommodation unit 30 in the vertical direction Z.

On the other hand, the position adjustment unit 62 can remove the drive belt 82 from the pulleys 85A to 85D. In this way, the pulleys 85A to 85D can rotate independently of each other. In other words, each of the screw shafts 84A to 84D can be independently rotated. Then, the position adjustment unit 62 can change the inclination of the support surface 29 with respect to the vertical direction Z, by some of the plurality of position adjustment mechanisms 80A to 80D being manually and independently moved in the state in which the drive belt 82 is removed from the pulleys 85A to 85D.

Printing Control Processing

Here, printing control processing will be described with reference to FIG. 14. The printing control processing is processing executed by the control unit 53 at a predetermined period. Here, the order of the processing can be changed as desired insofar as it does not depart from the purpose of the processing.

Figure 14:
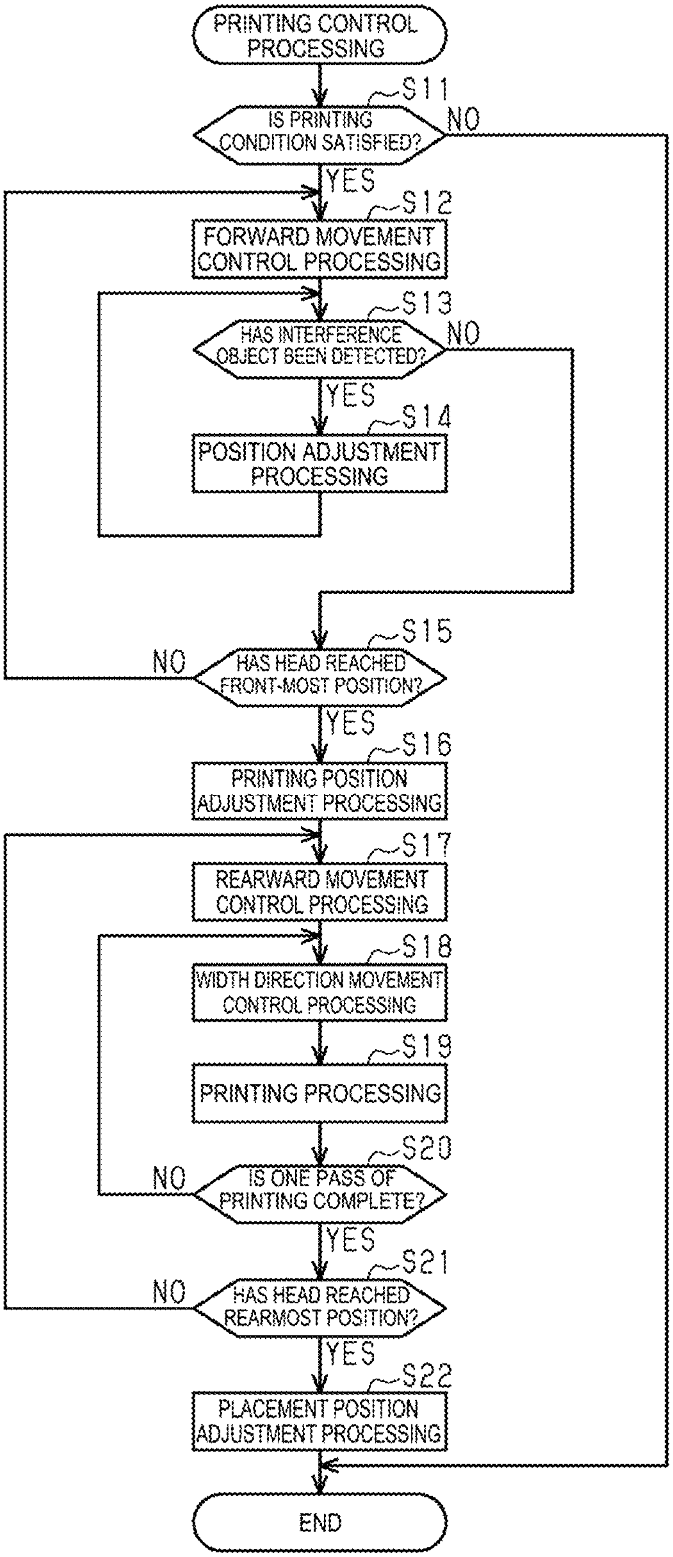
FIG. 14 is a flowchart illustrating printing control processing.

As illustrated in FIG. 14, at step S11, the control unit 53 determines whether or not a printing condition is satisfied. In this processing, the control unit 53 determines that the print condition is satisfied by receiving a print command from the user when printing is not being performed. When the control unit 53 determines that the print condition is not satisfied, the control unit 53 ends the printing control processing. On the other hand, when the control unit 53 determines that the printing condition is satisfied, the control unit 53 shifts the processing to step S12.

At step S12, the control unit 93 performs forward movement control processing. In this processing, the control unit 53 controls the second driving unit 56 so that the second head moving unit 43 moves the head 36 to the front side Y1 by a predetermined distance. When this processing is complete, the control unit 53 shifts the processing to step S13.

At step S13, the control unit 53 determines whether or not an interference object interfering with the head 36 is detected, based on the detection signal from the interference object detector 61. When the control unit 53 determines that the interference object has not been detected, the control unit 53 shifts the processing to step S15 without executing step S14. On the other hand, when the control unit 53 determines that the interference object has been detected, the control unit 53 shifts the processing to step S14.

At step S14, the control unit 93 performs position adjustment processing. In this processing, the control unit 53 controls the position adjustment unit 62 to move the support surface 29 to the lower side Z2 by a predetermined distance. When this processing is complete, the control unit 53 shifts the processing to step S13. In this way, the control unit 53 controls the position adjustment unit 62 to move the support surface 29 to the lower side Z2, to a position at which the interference object is not detected.

At step S15, the control unit 53 determines whether or not the head 36 has reached the front-most position, based on the detection signal from the front position detector 59. When the control unit 53 determines that the head 36 has not reached the front-most position, the control unit 53 shifts the processing to step S12 once more. In this way, the control unit 53 controls the position adjustment unit 62 to move the head 36 to the front side Y1 until the head 36 reaches the front-most position, and to move the support surface 29 to the lower side Z2 until the interference object is not detected. On the other hand, when the control unit 53 determines that the head 36 has reached the front-most position, the control unit 53 shifts the processing to step S16.

At step S16, the control unit 53 performs printing position adjustment processing. In this processing, the control unit 53 controls the position adjustment unit 62 so as to move the support surface 29 to the lower side Z2 by a specified distance. In this way, the control unit 53 controls the position adjustment unit 62 to move the support surface 29 to the lower side Z2 by the specified distance from the position at which the interference object is not detected. When this processing is complete, the control unit 53 shifts the processing to step S17.

At step S17, the control unit 53 performs rearward movement control processing. In this processing, the control unit 53 controls the second driving unit 56 to move the head 36 to the rear side Y2 by a predetermined distance. When this processing is complete, the control unit 53 shifts the processing to step S18.

At step S18, the control unit 53 performs width direction movement control processing. In this processing, the control unit 53 controls the first driving unit 55 so that the first head moving unit 4 moves the head 36 in the width direction X by a predetermined distance. When this processing is complete, the control unit 53 shifts the processing to step S19.

At step S19, the control unit 53 performs printing processing. In this processing, the control unit 53 controls the head 36 to perform the printing on the medium based on image data included in the print command. When this processing is complete, the control unit 53 shifts the processing to step S20.

At step S20, the control unit 53 determines whether or not one pass of the printing is complete, based on the detection signal from the movement position detector 58. When the control unit 53 determines that the one pass of the printing is not complete, the control unit 53 shifts the processing to step S18 once more. In this way, the control unit 53 performs the one pass of the printing. When the control unit 53 determines that the one pass of the printing is complete, the control unit 53 shifts the processing to step S21.

At step S21, the control unit 53 determines whether or not the head 36 has reached the rearmost position, based on the detection signal from the rear position detector 60. When the control unit 53 determines that the head 36 has not reached the rearmost position, the control unit 53 shifts the processing to step S17 once more. In this way, the control unit 53 controls the head 36 to move the head 36 to the rear side Y2 and in the width direction X until the head 36 reaches the rearmost position, and to perform the printing on the medium. On the other hand, when the control unit 53 determines that the head 36 has reached the rearmost position, the control unit 53 shifts the processing to step S22.

At step S22, the control unit 53 performs placement position adjustment processing. In this processing, the control unit 53 controls the position adjustment unit 62 to move the support surface 29 to the placement position, by moving the support surface 29 to the upper side Z1. When this processing is complete, the control unit 53 ends the printing control processing.

In this way, when a driving condition is satisfied, the control unit 53 drives the position adjustment unit 62 so that the support surface 29 is positioned at the placement position. The driving condition is satisfied when the printing is not being performed, and the head 36 is disposed at the retracted position. Thus, when the head 36 is disposed at the retracted position while the printing is not being performed, the position adjustment unit 62 can move the support surface 29 to a position higher than the nozzle surface 38 in the vertical direction Z. In other words, when the head 36 is disposed at the retracted position while the printing is not being performed, the position adjustment unit 62 can move the support surface 29 from being outside the movement range to being within the movement range.

Effects of First Embodiment

Effects of the first embodiment will be described.

As illustrated in FIG. 10, in the printing apparatus 10, when a power source is turned on, the support surface 29 is disposed at the placement position in a state in which the head 36 is disposed at the standby position. As a result, the support surface 29 is raised so as to be disposed within the movement range 46 of the head 36.

As illustrated in FIG. 11 and FIG. 12, in the state in which the opening 19 is open and the support surface 29 is disposed at the placement position, the user can easily remove the drive belt 82 from the pulleys 85A to 85D. In this way, the user can change the inclination of the support surface 29 in accordance with independently moving some of the plurality of position adjustment mechanisms 80A to 80D.

Figure 15:
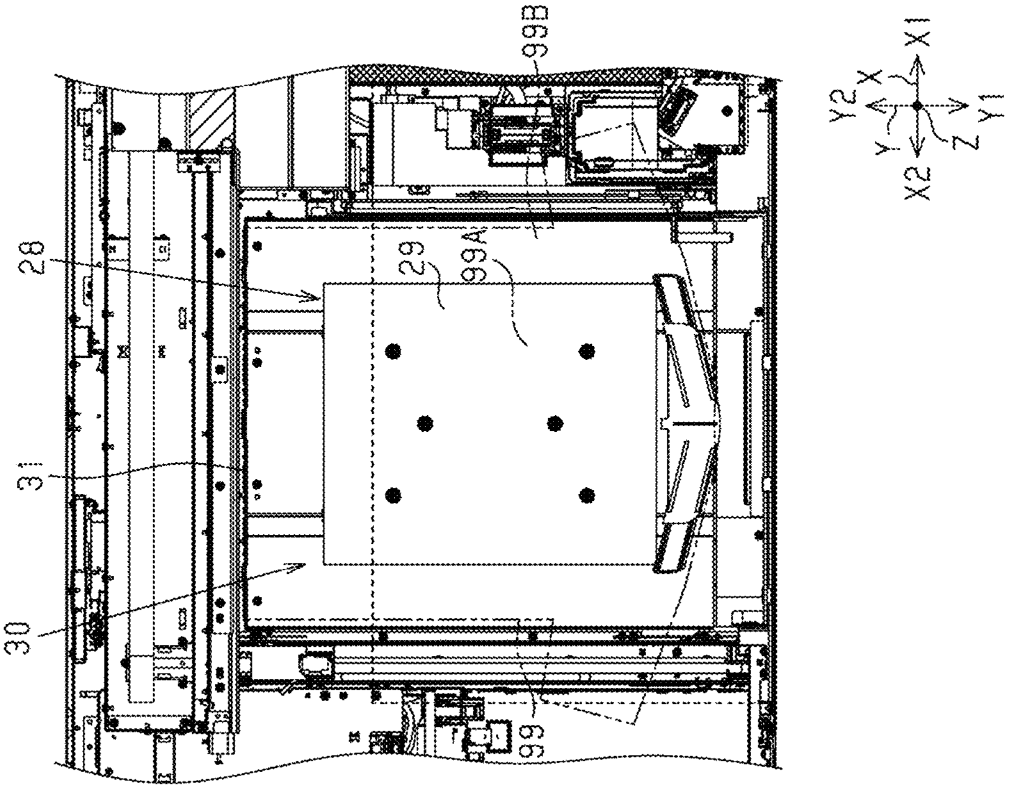
FIG. 15 is a front view illustrating the printing apparatus.

As illustrated in FIG. 15, in the state in which the opening 19 is open and the support surface 29 is disposed at the placement position, the user can easily place a T-shirt 99 on the support surface 29 from the front side Y1. Specifically, the inner surface of the body of the T-shirt 99 is placed on the support surface 29 by passing the body of the T-shirt 99 from the front side Y1 of the tray 69. In this case, at least a printing region 99A of the T-shirt 99 is supported by the support surface 29.

Further, when the T-shirt 99 is placed on the support surface 29, the positioning of the T-shirt 99 with respect to the support surface 29 is performed by the positioning portion 72. In particular, the user can place the T-shirt 99 on the support surface 29 while visually recognizing the center position of the T-shirt 99 in the width direction X and positions that are line-symmetric with respect to the center position of the T-shirt 99, with reference to the positioning reference portions 75. A tag of the T-shirt 99 can be given as an example of the center position of the T-shirt 99 in the width direction X. A position around the neck of the T-shirt 99 can be given an example of positions that are line-symmetric with respect to the center position of the T-shirt 99.

Further, by adjusting the position changing portions 73 and the extending/contracting portion 74 in accordance with the size of the T-shirt 99, the T-shirt 99 can be placed at an appropriate position on the support surface 29. In particular, by adjusting the position changing portions 73, the T-shirt 99 can be placed at an appropriate position on the support surface 29 with respect to the front-rear direction Y. Further, by adjusting the extending/contracting portion 74, the T-shirt 99 can be placed at an appropriate position on the support surface 29 at a position that is line-symmetric with respect to the center position of the T-shirt 99.

Figure 16:
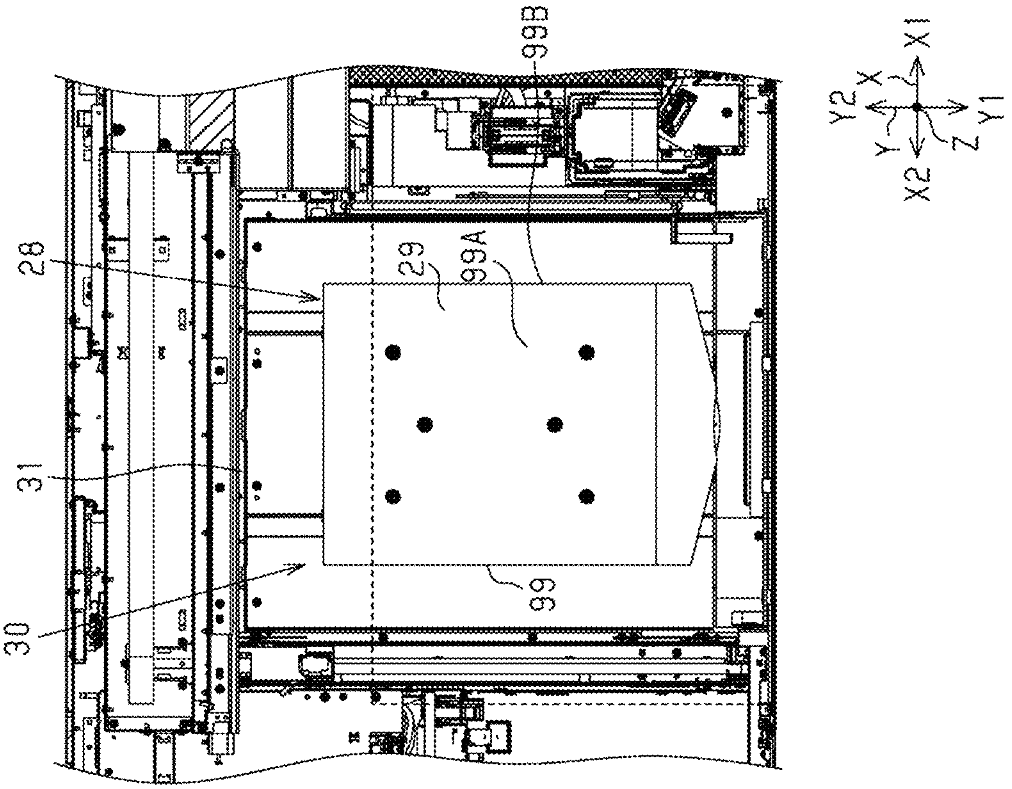
FIG. 16 is a front view illustrating the printing apparatus.
Figure 17:
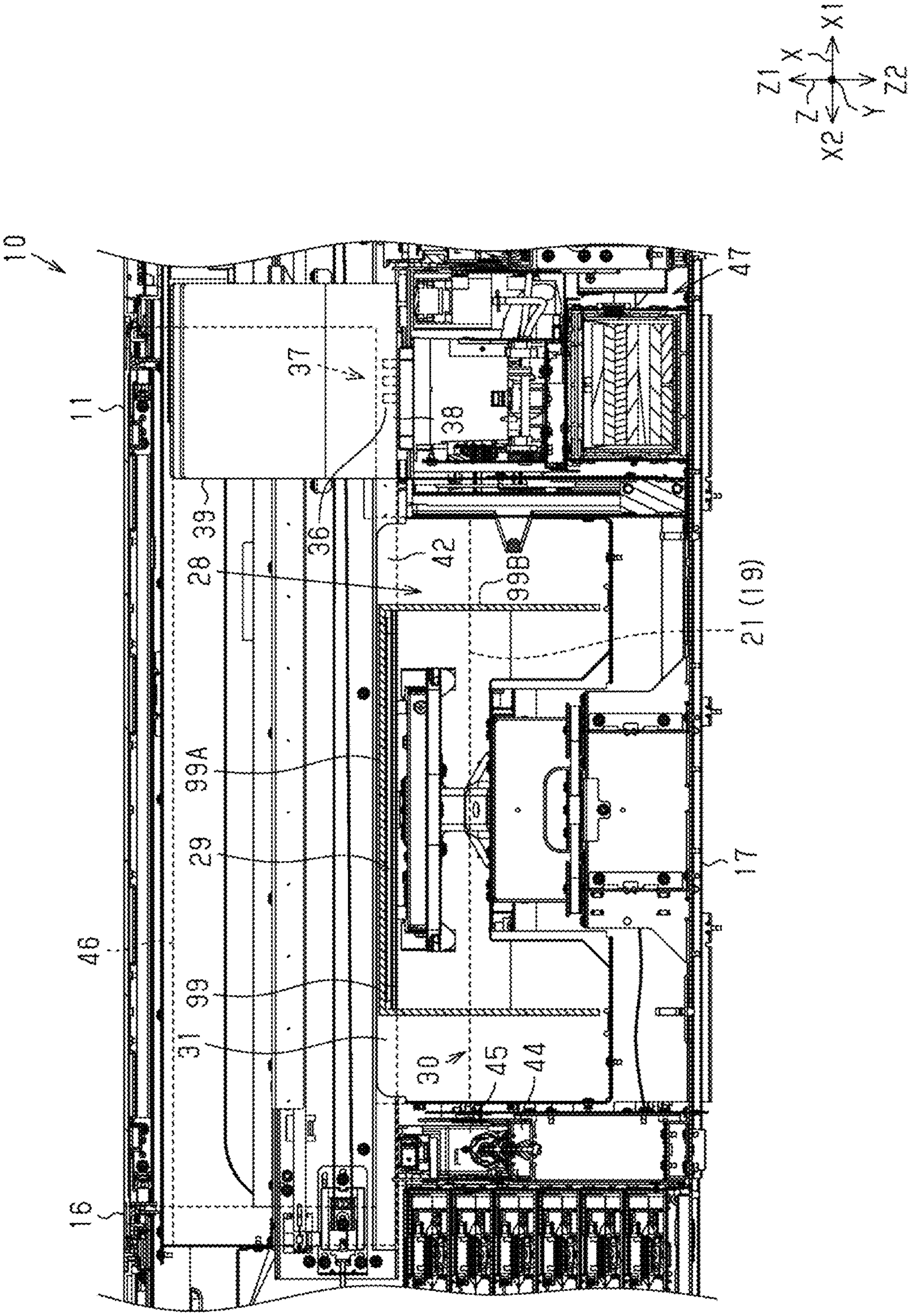
FIG. 17 is a front view illustrating the printing apparatus.

Then, as illustrated in FIG. 16 and FIG. 17, a non-placement region 99B of the T-shirt 99 is accommodated in the medium accommodation unit 30. The non-placement region 99B is a partial region of the T-shirt 99 that is not supported by the support surface 29. Specifically, the non-placement region 99B is accommodated in the medium accommodation unit 30 in the first width direction X1, the second width direction X2, and at the rear side Y2 of the support surface 29.

As illustrated in FIG. 5, when the print command is input in the state in which the opening 19 is closed, the position adjustment unit 62 moves the support surface 29 to the lower side Z2 to the position at which the interference object is not detected, in accordance with the movement of the head 36 to the front side Y1. As a result, the support surface 29 is disposed at the printing position.

In particular, as illustrated in FIG. 11 to FIG. 13, by the driving of the position adjustment driving unit 81, the driving force from the position adjustment driving unit 81 is transmitted to all of the pulleys 85A to 85D via the drive belt 82 and the power transmission unit 83. In this way, all of the pulleys 85A to 85D rotate in conjunction with each other, so that all of the screw shafts 84A to 84D also rotate in conjunction with each other. All of the male thread bushes 86A to 86D move in conjunction with each other in the vertical direction Z, so that the position of the support surface 29 can be adjusted in the vertical direction Z via the main body portion 71. In this way, the position adjustment unit 62 can adjust the position of the support surface 29 in the vertical direction Z in accordance with all of the plurality of position adjustment mechanisms 80A to 80D moving in conjunction with each other.

Then, the printing is performed in accordance with the head 36 moving to the rear side Y2. In this way, the printing unit 35 can perform the printing on the medium placed on the support surface 29 without the head 36 colliding with the support surface 29.

Then, as illustrated in FIG. 10, when the printing is complete, the position adjustment unit 62 moves the support surface 29 from the printing position to the placement position in the state in which the head 36 is disposed at the standby position. Thus, when the printing is not being performed, the position adjustment unit 62 can adjust the position of the support surface 29 to the upper side Z1, to a position higher than when the printing is being performed. Further, the accommodation tray 31 moves to the upper side Z1 in conjunction with the support surface 29, and the accommodation tray 31 covers the first guide portion 42 from the front side Y1. Accordingly, the user can be inhibited from touching the first guide portion 42.

Effects of First Embodiment

Effects of the first embodiment will be described.

(1) The position adjustment unit 62 includes the plurality of position adjustment mechanisms 80A to 80D that adjust the position of the support surface 29 in the vertical direction Z. The position adjustment unit 62 can change the inclination of the support surface 29 by some of the plurality of position adjustment mechanisms 80A to 80D being independently moved, and can change the position of the support surface 29 in the vertical direction Z by all of the plurality of position adjustment mechanisms 80A to 80D moving in conjunction with each other. In related art, an inclination adjustment unit is provided separately from the position adjustment unit, which causes an increase in the size of the printing apparatus. Here, by adopting the above-described configuration, it is possible to change the inclination of the support surface 29 and to change the position of the support surface 29 in the vertical direction Z, by independently moving some of the plurality of position adjustment mechanisms 80A to 80D and by moving all of the plurality of position adjustment mechanisms 80A to 80D in conjunction with each other. Accordingly, it is not necessary to provide the inclination adjustment unit separately from the position adjustment unit 62. Accordingly, the size of the printing apparatus 10 can be reduced.

(2) The plurality of position adjustment mechanisms 80A to 80D respectively include the screw shafts 84A to 84D and adjust the position of the support surface 29 in the vertical direction Z by rotation of the screw shafts 84A to 84D. Thus, it is possible to both change the inclination of the support surface 29 and change the position of the support surface 29 in the vertical direction Z with a simple configuration. Accordingly, the size of the printing apparatus 10 can be reduced.

(3) The position adjustment unit 62 transmits the driving force from the drive belt 82 to the pulleys 85A to 85D provided at all of the plurality of position adjustment mechanisms 80A to 80D. In this way, the position adjustment unit 62 can change the position of the support surface 29 in the vertical direction Z, by all the plurality of position adjustment mechanisms 80A to 80D moving in conjunction with each other. Therefore, by driving the drive belt 82 that transmits the driving force to the pulleys 85A to 85D, all of the plurality of position adjustment mechanisms 80A to 80D can be moved in conjunction with each other via the driving of the pulleys 85A to 85D provided at all of the plurality of position adjustment mechanisms 80A to 80D. Thus, the position of the support surface 29 in the vertical direction Z can be changed with a simple configuration. Accordingly, the size of the printing apparatus 10 can be reduced.

(4) The position adjustment driving unit 81 drives the drive belt 82. The control unit 53 drives the position adjustment driving unit 81 when the driving condition is satisfied. Thus, when the driving condition is satisfied, all of the plurality of position adjustment mechanisms 80A to 80D can be moved in conjunction with each other. In this way, the position of the support surface 29 in the vertical direction Z can be changed with a simple configuration. Accordingly, the size of the printing apparatus 10 can be reduced.

(5) The position adjustment unit 62 can change the inclination of the support surface 29 by some of the plurality of position adjustment mechanisms 80A to 80D being manually and independently moved. Thus, the inclination of the support surface 29 can be changed with a simple configuration. Accordingly, the size of the printing apparatus 10 can be reduced.

(6) The position adjustment unit 62 can change the position of the medium accommodation unit 30 in the vertical direction Z by all of the plurality of position adjustment mechanisms 80A to 80D moving in conjunction with each other. Thus, it is possible to change the position in the vertical direction Z of not only the support surface 29 supporting the medium but also the medium accommodation unit 30 that can accommodate the non-placement region 99B, of the medium, not supported by the support surface 29.

(1) The medium support unit 28 includes the support surface 29 that supports at least the printing region 99A of the medium. The medium accommodation unit 30 can accommodate the non-placement region 99B of the medium that is not supported by the support surface 29. The medium support unit 28 is configured not to move in the direction parallel to the support surface 29. The head moving unit 40 moves the head 36 in the direction parallel to the support surface 29. In known art, it is necessary for the tray to be moved to the outside of the housing in order to place the medium, and a mechanism for stably moving the tray to the outside of the housing is required, which causes an increase in the size of the printing apparatus. Here, by adopting the above-described configuration, it is not necessary to provide a configuration for moving the support surface 29 in the direction parallel to the support surface 29. Accordingly, the size of the printing apparatus 10 can be reduced. In particular, even in a case in which the configuration including the medium accommodation unit 30 is assumed, the size of the printing apparatus 10 can be reduced.

(8) The first head moving unit 41 moves the head 36 in the width direction X, and the second head moving unit 43 moves the head 36 in the front-rear direction Y. Thus, the head 36 can be moved in the width direction X and the front-rear direction Y, and it is not necessary to provide a configuration for moving the support surface 29 in the direction parallel to the support surface 29. Accordingly, the size of the printing apparatus 10 can be reduced.

(9) The housing 11 includes the opening 19 that exposes the support surface 29. For this reason, it is possible to place the medium on the support surface 29 accommodated in the housing 11 from the outside of the housing 11 through the opening 19, and it is possible to improve the operability for the user.

(10) The housing 11 includes the opening/closing cover 22 that can open and close the opening 19. Thus, when the opening 19 is opened by the opening/closing cover 22, it is possible to place the medium on the support surface 29 accommodated in the housing 11 from the outside of the housing 11 through the opening 19, and operability for the user can thus be improved. On the other hand, when the opening 19 is closed by the opening/closing cover 22, it is possible to prevent foreign matter from entering the inside of the housing 11 from the outside of the housing 11 through the opening 19.

(11) The housing 11 accommodates the medium support unit 28 and the printing unit 35. When the printing is not being performed, when the head 36 is disposed at the retracted position at which the nozzle surface 38 does not face the support surface 29, the position adjustment unit 62 can move the support surface 29 from being outside the movement range 46 of the head 36 to being within the movement range 46. In known art, it is necessary to move the tray to the outside of the housing in order to place the medium. Therefore, a space for placing the medium has to be secured on the outside of the housing. Therefore, it is necessary to secure a sufficient installation space for installing the printing apparatus. Here, by adopting the above-described configuration, since the medium support unit 28 and the printing unit 35 are accommodated in the housing 11, it is not necessary to secure the space for placing the medium on the outside of the housing 11. Thus, the installation space of the printing apparatus 10 can be reduced.

(12) Further, as long as the printing is not being performed and the head 36 is disposed at the retracted position, the support surface 29 can be moved from being outside the movement range 46 of the head 36 to being within the movement range 46. Thus, when placing the medium on the support surface 29, the user can perform the operation at a position close to the user, using the first opening 20 in the housing 11. Therefore, handling of the medium becomes easy, and it is possible to improve operability for the user. Further, the installation space of the printing apparatus 10 can be reduced.

(13) The tray support portion 70 supports the tray 69 having the support surface 29 on which the medium can be placed, and includes the positioning portion 72 that determines the placement position of the medium with respect to the tray 69. In known art, in order to move the tray in the horizontal direction, a positioning portion is provided at the tray itself on which the medium is placed. For this reason, the tray becomes heavy, and it is desired to reduce the weight of the tray in order to stably support the tray. Here, by adopting the above-described configuration, the positioning portion 72 that determines the placement position of the medium with respect to the tray 69 is provided not at the tray 69 itself but at the tray support unit 70 that supports the tray 69. Therefore, the weight of the tray 69 can be reduced.

(14) The positioning portion 72 includes the position changing portions 73 that can change the placement position of the medium with respect to the tray 69. Therefore, the position changing portions 73 are provided at the positioning portion 72. Thus, at the same time as being able to change the placement position of the medium with respect to the tray 69, it is also possible to reduce the weight of the tray 69.

(15) The position changing portions 73 can change the placement position of the medium with respect to the tray 69 in the front-rear direction Y. Therefore, the placement position of the medium can be adjusted in the front-rear direction Y. Thus, at the same time as being able to change the placement position of the medium with respect to the tray 69, it is also possible to reduce the weight of the tray 69.

(16) The tray support portion 70 includes the main body portion 71. The position changing portion 73 includes the position changing engaging portions 73B that engage with the main body portion 71 at the predetermined interval. Thus, the placement position of the medium with respect to the tray 69 can be adjusted at the predetermined interval. Thus, at the same time as being able to change the placement position of the medium with respect to the tray 69, it is also possible to reduce the weight of the tray 69.

(17) The positioning portion 72 has the line symmetric shape with respect to the front-rear direction Y. Thus, it is possible to appropriately place the medium having line symmetry on the support surface 29, using the positioning portion 72. Accordingly, the operability for the user can be improved.

(18) The positioning portion 72 includes the positioning reference portions 75 at the positions that are line-symmetric with respect to the front-rear direction Y. Thus, it is possible to appropriately place the medium on the placement surface while visually checking the positioning reference portions 75. Accordingly, the operability for the user can be improved.

(19) The positioning portion 72 includes the extending/contracting portion 74 that can extend and contract in accordance with the shape of the medium. Thus, it is possible to change the placement position of the medium with respect to the tray 69, using the extending/contracting portion 74. Thus, at the same time as being able to change the placement position of the medium with respect to the tray 69, it is also possible to reduce the weight of the tray 69.

(20) The extending/contracting portion 74 can be extended and contracted in a direction parallel to the support surface 29. Thus, it is possible to adjust the placement position of the medium in the direction parallel to the support surface 29. Thus, at the same time as being able to change the placement position of the medium with respect to the tray 69, it is also possible to reduce the weight of the tray 69.

(21) The extending/contracting portion 74 can extend and contract in the direction including the component in the width direction X. Therefore, it is possible to adjust the placement position of the medium in the direction including the component in the width direction X. Thus, at the same time as being able to change the placement position of the medium with respect to the tray 69, it is also possible to reduce the weight of the tray 69.

MODIFIED EXAMPLES

The embodiment can be modified and implemented as follows. The embodiment and the following modified examples can be combined and implemented insofar as no technical contradictions arise.

In plan view, the first opening 20 may have a shape having the same length as the support surface 29 in the front-rear direction Y, or may have a shape longer than the support surface 29 in the front-rear direction Y. In plan view, the first opening 20 may have a shape having the same length as the support surface 29 in the width direction X, or may have a shape shorter than the support surface 29 in the width direction X.

The first opening 20 and the second opening 21 need not necessarily be continuous with each other and may be provided separately from each other. The opening 19 need not necessarily be provided across the top surface 16 and the front surface 12.

The opening 19 may be provided across the top surface 16, the front surface 12, and the other surfaces. That is, the opening 19 may be provided across at least the top surface 16 and the front surface 12. The opening 19 may be provided at the top surface 16 and not be provided at the front surface 12. That is, it is sufficient that the opening 19 be provided at least at the top surface 16.

The opening/closing detector 63 may be configured to detect the open/closed state of the second opening/closing cover 24. In this way, an operation in accordance with the open/closed state of the second opening/closing cover 24 becomes possible. Thus, the operability for the user can be improved. Further, the opening/closing detector 63 may include a first opening/closing detector that detects the open/closed state of the second opening/closing cover 24, and a second opening/closing detector that detects the open/closed state of the second opening/closing cover 24.

The support surface 29 is configured not to move in the horizontal direction. However, for example, the support surface 29 may be finely adjustable in the horizontal direction only when the printing is not being performed, and it is sufficient that the support surface 29 be configured not to move in the horizontal direction at least when the printing is being performed.

The first opening 20 may have a shape that is longer than the support surface 29 in the front-rear direction Y when viewed from the upper side Z1.

When maintenance is performed in a state in which the printing is not being performed, the position adjustment unit 62 may move the support surface 29 from the placement position to the printing position. When maintenance, such as flushing, is performed in a state in which the printing is being performed, the position adjustment unit 62 may continuously dispose the support surface 29 at the printing position.

The position adjustment unit 62 may adjust the position of the support surface 29 in the vertical direction Z from the printing position to the placement position when the opening 19 is opened by the opening/closing cover 22. The position adjustment unit 62 may adjust the position of the support surface 29 in the vertical direction Z from the placement position to the printing position when the opening 19 is closed by the opening/closing cover 22.

In a single print command, the printing unit 35 may eject the liquid of one color or the liquid of a plurality of colors. In the single print command, the printing unit 35 may perform the printing when the head 36 is moved a plurality of times in the front-rear direction Y. As a specific example, when the single print command is input, the printing unit 35 may eject a white liquid in accordance with a first movement to the rear side Y2 and may eject a liquid of a color other than white in accordance with a second or subsequent movement to the rear side Y2. In this case, the position adjustment unit 62 adjusts the position of the support surface 29 in the vertical direction Z in accordance with a first movement to the front side Y1, but the position adjustment unit 62 may adjust the position of the support surface 29 in the vertical direction Z in accordance with a second or subsequent movement to the front side Y1. Further, the control unit 53 may determine that an error has occurred when the interference object is detected in association with a second or subsequent movement to the front side Y1. Further, when the interference object is detected even when the position of the support surface 29 in the vertical direction Z has been adjusted in accordance with the first movement to the front side Y1, the control unit 53 may determine that an error has occurred.

The printing unit 35 may perform the printing when the head 36 moves to either one of the front side Y1 and the rear side Y2, or may perform the printing both when the head 36 moves to the front side Y1 and when the head 36 moves to the rear side Y2.

The printing unit 35 may perform the printing when the head 36 moves in any one of the first width direction X1 and the second width direction X2, or may perform the printing both when the head 36 moves in the first width direction X1 and when the head 36 moves in the second width direction X2.

The head 36 may include the nozzle surface 38 that is parallel to the horizontal plane or may include the nozzle surface 38 that is inclined with respect to the horizontal plane.

The position changing unit 73 may be able to change the placement position of the medium with respect to the tray 69 in a direction including a component in the front-rear direction Y. The position changing unit 73 may be able to change the placement position of the medium with respect to the tray 69 in the width direction X.

It is sufficient that the extending/contracting portion 74 be able to extend and contract in a direction including a component of the width direction X, and the extending/contracting portion 74 may be able to extend and contract in the width direction X. The extending/contracting portion 74 may extend and contract in a direction intersecting the direction in which the position changing unit 73 changes the placement position of the medium with respect to the tray 69. Similarly to the position changing unit 73, the extending/contracting portion 74 may be adjustable at a predetermined interval.

It is sufficient that the positioning reference portion 75 be able to specify at least one of the center position of the medium and the positions that are line-symmetric with respect to the center position of the medium. For example, as long as it can be visually recognized, the positioning reference portion 75 may be provided with a mark capable of specifying a position, or may have a shape capable of specifying a position. The positioning reference portion 75 need not necessarily be provided at the position changing unit 73. The positioning portion 72 need not necessarily include at least one of the position changing portion 73, the extending/contracting portion 74, and the positioning reference portion 75.

The relationship between the width direction X and the front-rear direction Y in the embodiment may be switched. In other words, the width direction X of the embodiment may be the front-rear direction Y, and the front-rear direction Y of the embodiment may be the width direction X.

For example, the medium is not limited to the T-shirt, a polo shirt, or the like, and may be a sweatshirt, a hooded sweatshirt, or the like, for example, or may be a medium such as clothing. Further, the medium having flexibility is adopted as the medium, but the medium is not limited to this example, and a medium having no flexibility, such as a smartphone case printed using UV ink, may be adopted, for example.

The printing apparatus 10 may be configured to eject ink as an example of the liquid, but may be configured to eject a liquid other than ink. In other words, the liquid can be arbitrarily selected as long as it can perform the printing on the medium by adhering to the medium. The printing apparatus 10 performs the printing on the medium by ejecting the liquid onto the medium, but is not limited to this example, and may perform the printing on the medium by a laser method, for example.

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

SUPPLEMENTARY DESCRIPTION

Hereinafter, technical concepts and effects thereof that are understood from the above-described exemplary embodiments and modified examples are described.

(A) A printing apparatus includes a medium support unit having a support surface supporting a medium, a head configured to eject a liquid onto the medium supported by the support surface, and a head moving unit configured to move the head. The medium support unit includes a position adjustment unit configured to adjust a position of the support surface in an intersecting direction intersecting the support surface. The position adjustment unit includes a plurality of position adjustment mechanisms configured to adjust the position of the support surface in the intersecting direction, the position adjustment unit being configured to change an inclination of the support surface by some of the plurality of position adjustment mechanisms moving independently, and to change the position of the support surface in the intersecting direction by all the plurality of position adjustment mechanisms moving in conjunction with each other.

According to this configuration, it is possible to change the inclination of the support surface and to change the position of the support surface with respect to the intersecting direction, by independently moving some of the plurality of position adjustment mechanisms, and by moving all of the plurality of position adjustment mechanisms in conjunction with each other. In this way, it is not necessary to provide the inclination adjustment unit separately from the position adjustment unit. Accordingly, the size of the printing apparatus can be reduced.

(B) In the printing apparatus, each of the plurality of position adjustment mechanisms may include a screw shaft, and may adjust the position of the support surface in the intersecting direction by rotation of the screw shaft. According to this configuration, it is possible to change both the inclination of the support surface and the position of the support surface in the intersecting direction with a simple configuration. Accordingly, the size of the printing apparatus can be reduced.

(C) In the printing apparatus, each of the plurality of position adjustment mechanisms may include a pulley coupled to the screw shaft. The position adjustment unit may include a drive belt that transmits a driving force to the pulley. The position adjustment unit may be configured to change the position of the support surface in the intersecting direction by all of the plurality of position adjustment mechanisms moving in conjunction with each other as the position adjustment unit transmits the driving force from the drive belt to the pulleys provided at all of the plurality of position adjustment mechanisms.

According to this configuration, all of the plurality of position adjustment mechanisms can be moved in conjunction with each other through the driving of the pulleys provided at all of the plurality of position adjustment mechanisms, by the driving of the driving belt that transmits the driving force to the pulleys. With this configuration, the position of the support surface in the intersecting direction can be changed with a simple configuration. Accordingly, the size of the printing apparatus can be reduced.

(D) The printing apparatus may include a position adjustment driving unit configured to drive the drive belt, and a control unit configured to drive the position adjustment driving unit. The control unit may drive the position adjustment driving unit when a driving condition is satisfied.

According to this configuration, when the driving condition is satisfied, all of the plurality of position adjustment mechanisms can be moved in conjunction with each other. With this configuration, the position of the support surface in the intersecting direction can be changed with a simple configuration. Accordingly, the size of the printing apparatus can be reduced.

(E) In the printing apparatus, the position adjustment unit may be configured to change the inclination of the support surface by some of the plurality of position adjustment mechanisms being independently and manually moved.

According to this configuration, the inclination of the support surface can be changed with a simple configuration. Accordingly, the size of the printing apparatus can be reduced.

(F) The printing apparatus may include a medium accommodation unit configured to accommodate a region, of the medium, not supported by the support surface. The position adjustment unit may be configured to change a position of the medium accommodation unit in the intersecting direction by all of the plurality of position adjustment mechanisms moving in conjunction with each other.

According to this configuration, it is possible to change the position in the intersecting direction of not only the support surface supporting the medium but also the medium accommodation unit that can accommodate the region, of the medium, not supported by the support surface.

(G) In the printing apparatus, the medium support unit may be configured not to move in a direction parallel to the support surface.

According to this configuration, it is not necessary to provide a configuration for moving the support surface in a direction parallel to the support surface. Accordingly, the size of the printing apparatus can be reduced.

(H) In the printing apparatus, the head moving unit may include a first head moving unit and a second head moving unit. The first head moving unit may move the head in a first direction parallel to the support surface, and the second head moving unit may move the head in a second direction parallel to the support surface and intersecting the first direction.

According to this configuration, the head can be moved in the first direction and the second direction, and there is no need to provide a configuration for moving the support surface in a direction parallel to the support surface. Accordingly, the size of the printing apparatus can be reduced.

(I) The printing apparatus may include a housing configured to accommodate the medium support unit, the head, and the head moving unit. The housing may include an opening exposing the support surface.

According to this configuration, it is possible to place the medium on the support surface accommodated in the housing from the outside of the housing via the opening, and operability for the user can thus be improved.

(J) In the printing apparatus, the housing may include an opening/closing cover configured to open and close the opening.

According to this configuration, when the opening is opened by the opening/closing cover, it is possible to place the medium on the support surface accommodated in the housing from the outside of the housing via the opening, and the operability for the user can thus be improved. On the other hand, when the opening is closed by the opening/closing cover, it is possible to prevent foreign matter from entering the inside of the housing from the outside of the housing via the opening.

(I) In the printing apparatus, the position adjustment unit may include four of the position adjustment mechanisms as the plurality of position adjustment mechanisms. The four position adjustment mechanisms may be provided at positions forming a rectangular shape when viewed from the intersecting direction. According to this configuration, the same effects as for (A) can be obtained.

What is claimed is:

1. A printing apparatus comprising:

a medium support unit having a support surface supporting a medium;

a head configured to eject a liquid onto the medium supported by the support surface; and a head moving unit configured to move the head, wherein the medium support unit includes a position adjustment unit configured to adjust a position of the support surface in an intersecting direction intersecting the support surface, and the position adjustment unit includes a plurality of position adjustment mechanisms configured to adjust the position of the support surface in the intersecting direction, the position adjustment unit being configured to change an inclination of the support surface by some of the plurality of position adjustment mechanisms moving independently, and to change the position of the support surface in the intersecting direction by all the plurality of position adjustment mechanisms moving in conjunction with each other.

2. The printing apparatus according to claim 1, wherein each of the position adjustment mechanisms includes a screw shaft, and adjusts the position of the support surface in the intersecting direction by rotation of the screw shaft.

3. The printing apparatus according to claim 2, wherein each of the plurality of position adjustment mechanisms includes a pulley coupled to the screw shaft, and the position adjustment unit includes a drive belt configured to transmit a driving force to the pulley, the position adjustment unit being configured to change the position of the support surface in the intersecting direction by all of the plurality of position adjustment mechanisms moving in conjunction with each other as the position adjustment unit transmits the driving force from the drive belt to the pulleys provided at all of the plurality of position adjustment mechanisms.

4. The printing apparatus according to claim 3, comprising:

a position adjustment driving unit configured to drive the drive belt; and a control unit configured to drive the position adjustment driving unit, wherein the control unit drives the position adjustment driving unit when a driving condition is satisfied.

5. The printing apparatus according to claim 1, wherein the position adjustment unit is configured to change the inclination of the support surface by some of the plurality of position adjustment mechanisms being independently and manually moved.

6. The printing apparatus according to claim 1, comprising:

a medium accommodation unit configured to accommodate a region, of the medium, not supported by the support surface, wherein the position adjustment unit is configured to change a position of the medium accommodation unit in the intersecting direction by all of the plurality of position adjustment mechanisms moving in conjunction with each other.

7. The printing apparatus according to claim 1, wherein the medium support unit is configured not to move in a direction parallel to the support surface.

8. The printing apparatus according to claim 1, wherein the head moving unit includes a first head moving unit and a second head moving unit, the first head moving unit moves the head in a first direction parallel to the support surface, and the second head moving unit moves the head in a second direction parallel to the support surface and intersecting the first direction.

9. The printing apparatus according to claim 1, comprising a housing configured to accommodate the medium support unit, the head, and the head moving unit, and the housing includes an opening exposing the support surface.

10. The printing apparatus according to claim 9, wherein the housing includes an opening/closing cover configured to open and close the opening.

11. The printing apparatus according to claim 1, wherein the position adjustment unit includes four of the position adjustment mechanisms as the plurality of position adjustment mechanisms, and the four position adjustment mechanisms are provided at positions forming a rectangular shape when viewed from the intersecting direction.

* * * * *